United States Patent
Yoneda et al.

(10) Patent No.: US 8,670,904 B2
(45) Date of Patent: Mar. 11, 2014

(54) MOTOR CONTROL DEVICE AND ELECTRIC STEERING SYSTEM

(75) Inventors: Atsuhiko Yoneda, Utsunomiya (JP); Yasuo Shimizu, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 508 days.

(21) Appl. No.: 12/937,485

(22) PCT Filed: May 28, 2009

(86) PCT No.: PCT/JP2009/059799
§ 371 (c)(1),
(2), (4) Date: Oct. 12, 2010

(87) PCT Pub. No.: WO2009/145270
PCT Pub. Date: Dec. 3, 2009

(65) Prior Publication Data
US 2011/0035114 A1    Feb. 10, 2011

(30) Foreign Application Priority Data

May 28, 2008   (JP) ............................... P2008-139802

(51) Int. Cl.
| | | |
|---|---|---|
| G06F 17/00 | (2006.01) | |
| G06F 19/00 | (2011.01) | |
| B62D 6/00 | (2006.01) | |
| G08B 1/06 | (2006.01) | |

(52) U.S. Cl.
USPC ........... 701/42; 701/29.2; 701/30.3; 318/639; 180/404; 180/443

(58) Field of Classification Search
USPC .............. 701/41, 42, 43, 29.1, 29.2, 29.7, 36, 701/30.3, 30.4, 30.9, 31.1–31.3; 318/638, 318/639, 640; 180/402, 404, 412, 415, 416, 180/443, 446, 514.39; 73/1.37, 1.41, 1.79, 73/1.84, 488
See application file for complete search history.

(56) References Cited

U.S. PATENT DOCUMENTS 6,138,788 A * 10/2000 Bohner et al. ................ 180/405
6,799,656 B2 * 10/2004 Kimura et al. ................ 180/446
(Continued)

FOREIGN PATENT DOCUMENTS

| JP | 11-059447 A | 3/1999 |
|---|---|---|
| JP | 2001-112282 A | 4/2001 |

(Continued)

OTHER PUBLICATIONS

Chinese Office Action issued Oct. 30, 2012, in counterpart Chinese Application No. 200980117560 (13 pages including English translation).

(Continued)

*Primary Examiner* — Thomas Tarcza
*Assistant Examiner* — Edward Pipala
(74) *Attorney, Agent, or Firm* — Arent Fox LLP

(57) ABSTRACT

A motor control device includes: a rotation angle detection portion that detects a rotation angle of a motor and outputs a rotation angle signal; an abnormal condition detection portion that detects the presence or absence of an abnormal condition of the rotation angle detection portion; a rotation angle estimation portion that estimates the rotation angle of the motor and outputs an estimate rotation angle signal; and a driving control portion that controls driving of the motor on the basis of the rotation angle signal, which is output from the rotation angle detection portion, when the abnormal condition detection portion does not detect an abnormal condition of the rotation angle detection portion, and controls driving of the motor on the basis of the estimate rotation angle signal, which is output from the rotation angle estimation portion, when the abnormal condition detection portion detects an abnormal condition of the rotation angle detection portion.

7 Claims, 23 Drawing Sheets

(56) References Cited

U.S. PATENT DOCUMENTS

| | | | |
|---|---|---|---|
| 7,500,538 B2 * | 3/2009 | Hara et al. | 180/412 |
| 2002/0053481 A1 | 5/2002 | Itakura et al. | |
| 2005/0171667 A1 * | 8/2005 | Morita | 701/43 |
| 2007/0225885 A1 * | 9/2007 | Hara et al. | 701/43 |

FOREIGN PATENT DOCUMENTS

| | | |
|---|---|---|
| JP | 2001-112282 A | 4/2001 |
| JP | 2003-170844 A | 6/2003 |
| JP | 2004-112939 A | 4/2004 |
| JP | 2004-112939 A | 4/2004 |
| JP | 2005-045916 A | 2/2005 |
| JP | 2005-045916 A | 2/2005 |
| JP | 2005-274484 A | 10/2005 |
| WO | WO 2007/138772 A1 | 12/2007 |

OTHER PUBLICATIONS

Notice of Allowance, Japanese Application No. 2010-514539, mailed dated Apr. 25, 2013.

* cited by examiner

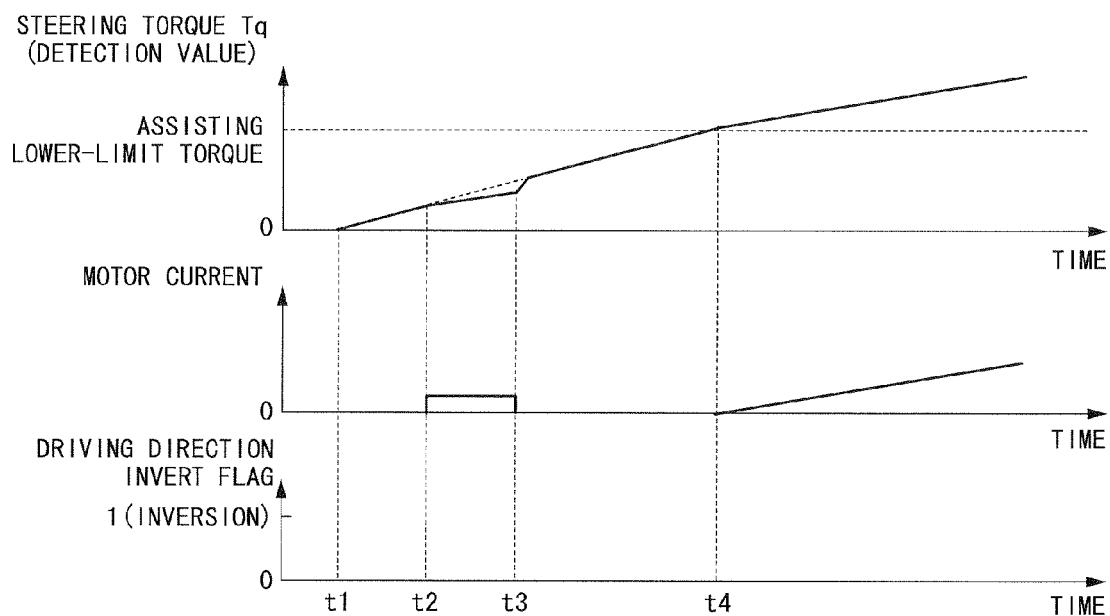
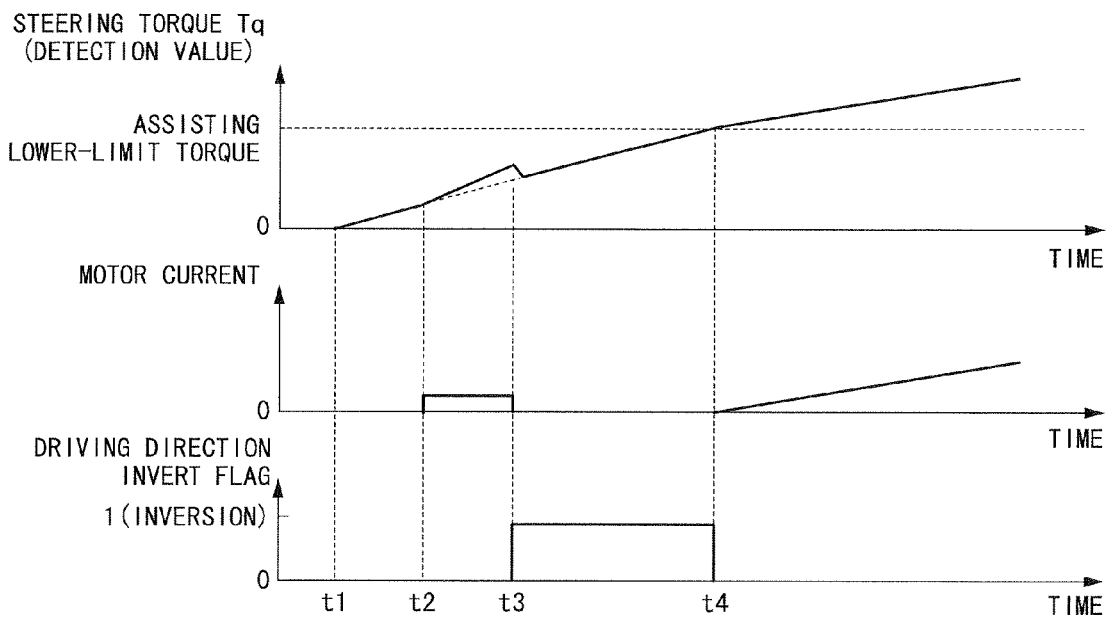

MOTOR CONTROL DEVICE AND ELECTRIC STEERING SYSTEM

BACKGROUND OF THE INVENTION

1. Field of the Invention

The present invention relates to a motor control device and an electric steering system.

Priority is claimed on Japanese Patent Application No. 2008-139802, filed on May 28, 2008, the content of which is incorporated herein by reference.

2. Description of Related Art

Conventionally, for example, in electric power steering systems using the driving force of brushless motors, there are known systems which detect a rotation angle of a brushless motor by using a resolver and which, on the basis of the detection result, control the driving of the brushless motor (for example, refer to Japanese Unexamined Patent Application, First Publication No. 2005-274484).

However, in the electric power steering system disclosed in Japanese Unexamined Patent Application, First Publication No. 2005-274484, when abnormal condition occurs in a rotation sensor, such as a resolver or an encoder, for directly detecting the rotation angle, it becomes difficult to flow a current with an appropriate phase to the brushless motor. Hence, it becomes difficult to perform the driving control. For this reason, in the case where an abnormal condition of the rotation sensor is detected, the driving control of the brushless motor is stopped, it becomes difficult to reduce the load of steering force which is necessary for a driver, and thus a problem arises in that the steering feels uncomfortable to the driver.

SUMMARY OF THE INVENTION

In view of the above situation, it is an object of the present invention to provide a motor control device capable of performing appropriate driving control while promptly and accurately estimating the rotation angle and provide an electric steering system capable of preventing a driver from feeling uncomfortable when steering even when an abnormal condition occurs in the rotation sensor for directly detecting the rotation angle of the motor.

In order to achieve the object for solving the problem, the present invention has the following configurations.

That is, according to a first aspect of the present invention, a motor control device includes: a rotation angle detection portion that detects a rotation angle of a motor and outputs a rotation angle signal; an abnormal condition detection portion that detects presence or absence of an abnormal condition of the rotation angle detection portion; a rotation angle estimation portion that estimates the rotation angle of the motor and outputs an estimate rotation angle signal; and a driving control portion that controls driving of the motor on the basis of the rotation angle signal, which is output from the rotation angle detection portion when the abnormal condition detection portion does not detect the abnormal condition of the rotation angle detection portion, and controls driving of the motor on the basis of the estimate rotation angle signal, which is output from the rotation angle estimation portion, when the abnormal condition detection portion detects the abnormal condition of the rotation angle detection portion.

Further, in the motor control device according to a second aspect of the present invention, when the abnormal condition detection portion detects the abnormal condition of the rotation angle detection portion, the driving control portion may gradually increase a control amount of a driving control of the motor on the basis of the estimate rotation angle signal when changing a control process from a driving control of the motor based on the rotation angle signal to the driving control of the motor based on the estimate rotation angle signal.

Furthermore, in the motor control device according to a third aspect of the present invention, the rotation angle detection portion may include a resolver.

In addition, according to a fourth aspect of the present invention, an electric steering system includes: the motor control device according to any one of the first to third aspects; a steering torque detection portion that detects a steering torque of the electric steering system and outputs a steering torque signal; a vehicle speed detection portion that detects a speed of the vehicle and outputs a vehicle speed signal; a steering control portion that controls driving of the motor by the driving control portion and causes the motor to generate an assist torque for assisting the steering torque, in accordance with the steering torque signal which is output from the steering torque detection portion, the vehicle speed signal which is output from the vehicle speed detection portion, and the rotation angle signal or the estimate rotation angle signal which is output from the motor control device.

In the electric steering system according to a fifth aspect of the present invention, when the vehicle speed signal which is output from the vehicle speed detection portion is less than a predetermined value, the steering control portion may allow the driving control portion to change a control process from a driving control of the motor based on the rotation angle signal to a driving control of the motor based on the estimate rotation angle signal.

In the electric steering system according to a sixth aspect of the present invention, when the steering torque signal which is output from the steering torque detection portion is less than a predetermined value, the steering control portion may allow the driving control portion to change a control process from the driving control of the motor based on the rotation angle signal to the driving control of the motor based on the estimate rotation angle signal.

In the electric steering system according to a seventh aspect of the present invention, the steering control portion may include a target driving amount setting portion that sets a target amount of the driving control of the motor on the basis of the vehicle speed signal which is output from the vehicle speed detection portion and the steering torque signal which is output from the steering torque detection portion; may control the driving of the motor by the driving control portion, in accordance with the target amount of the driving control which is set by the target driving amount setting portion; and may allow the driving control portion to change a control process from the driving control of the motor based on the rotation angle signal to the driving control of the motor based on the estimate rotation angle signal, when the target amount of the driving control which is set by the target driving amount setting portion is less than a predetermined value.

According to the motor control device in the first aspect of the present invention, even when abnormal condition occurs in the rotation angle detection portion for directly detecting the rotation angle of the motor, it is possible to perform appropriate driving control while promptly and accurately estimating the rotation angle. For example, it is possible to prevent troubles such as torque variation caused by loss of synchronism of the motor and stoppage caused by loss of synchronism of the motor.

Further, according to the motor control device in the second aspect of the present invention, when switching the control process, by gradually increasing the control amount of the driving control of the motor based on the estimate rotation angle signal, it is possible to prevent the output of the motor from rapidly varying.

Furthermore, according to the motor control device in the third aspect of the present invention, it is possible to smoothly control the driving of the motor.

In addition, according to the electric steering system in the fourth aspect of the present invention, even when an abnormal condition occurs in the rotation angle detection portion for directly detecting the rotation angle of the motor, it is possible to perform appropriate driving control while promptly and accurately estimating the rotation angle. For example, it is possible to prevent troubles such as torque variation caused by loss of synchronism of the motor and stoppage caused by loss of synchronism of the motor. Thus, it is possible to prevent the steering feeling from deteriorating, and simultaneously it is possible to prevent the driving motion of the vehicle from becoming unstable.

Further, according to the electric steering system in the fifth aspect of the present invention, when an abnormal condition is caused in the rotation angle detection portion for directly detecting the rotation angle of the motor, the driving control of the motor is temporarily stopped by a fail-safe process. Hence, the motor is in a stopped state in which the motor does not output an assist torque, and the driving control of the motor based on the estimate rotation angle signal subsequently starts to be performed.

For this reason, for example, in a high speed driving state, the yaw rate gain is relatively high, and the effect of steering on the motion of the vehicle increases. In this state, the control process may be changed from the driving control of the motor based on the rotation angle signal to the driving control of the motor based on the estimate rotation angle signal. In this case, the variation in the output of the motor excessively increases, and thus there is a concern that the vehicle motion becomes unstable.

In contrast, in the present invention, in a low speed driving state, the yaw rate gain is relatively low, and the effect of the steering on the vehicle motion is reduced, but the road surface load is relatively large, and thus a large assist torque is necessary. In this state, by allowing the switching of the control process from the driving control of the motor based on the rotation angle signal to the driving control of the motor based on the estimate rotation angle signal, it is possible to appropriately reduce the steering load of a driver.

Furthermore, according to the electric steering system in the sixth aspect of the present invention, when an abnormal condition occurs in the rotation angle detection portion for directly detecting the rotation angle of the motor, the driving control of the motor is temporarily stopped by a fail-safe process. Hence, the motor is in a stopped state in which the motor does not output an assist torque, and the driving control of the motor based on the estimate rotation angle signal subsequently starts to be performed.

For this reason, in the state in which the motor is stopped, the steering torque of the driver increases. Then, when the driving control of the motor based on the estimate rotation angle signal starts to be performed, the steering torque changes excessively. Thus, there are concerns that a driver feels uncomfortable when steering and the vehicle motion becomes unstable.

In contrast, in the present invention, when the steering torque of a driver is relatively small, by allowing the switching of the control process from the driving control of the motor based on the rotation angle signal to the driving control of the motor based on the estimate rotation angle signal, it is possible to prevent the steering torque from greatly varying.

Further, according to the electric steering system in the seventh aspect of the present invention, when an abnormal condition occurs in the rotation angle detection portion for directly detecting the rotation angle of the motor, the driving control of the motor is temporarily stopped by a fail-safe process. Hence, the motor is in a stopped state in which the motor does not output an assist torque, and the driving control of the motor based on the estimate rotation angle signal subsequently starts to be performed.

For this reason, in a state where the target amount of the driving control is relatively large, the control process may be changed from the driving control of the motor based on the rotation angle signal to the driving control of the motor based on the estimate rotation angle signal. In this case, the steering torque excessively changes, and thus there are concerns that a driver feels uncomfortable when steering and the vehicle motion becomes unstable.

In contrast, in the present invention, when the target amount of the driving control is relatively small, by allowing the switching of the control process from the driving control of the motor based on the rotation angle signal to the driving control of the motor based on the estimate rotation angle signal, it is possible to prevent the steering torque from greatly varying.

BRIEF DESCRIPTION OF THE DRAWINGS

FIG. 12 is a graph illustrating an example of a variation of a flag value of a driving direction invert flag, a motor current, and a steering torque Tq according to an embodiment of the present invention.

FIG. 13 is a graph illustrating an example of a variation of a flag value of a driving direction invert flag, a motor current, and a steering torque Tq according to an embodiment of the present invention.

DETAILED DESCRIPTION OF THE INVENTION

Hereinafter, a motor control device and an electric steering system according to an embodiment of the present invention will be described with reference to the accompanying drawings.

The motor control device (to be described later) according to the embodiment is mounted on an ECU (Electronic Control Unit) 50 of an electric steering system 1 as a steering system for a vehicle shown in FIG. 1.

Figure 1:
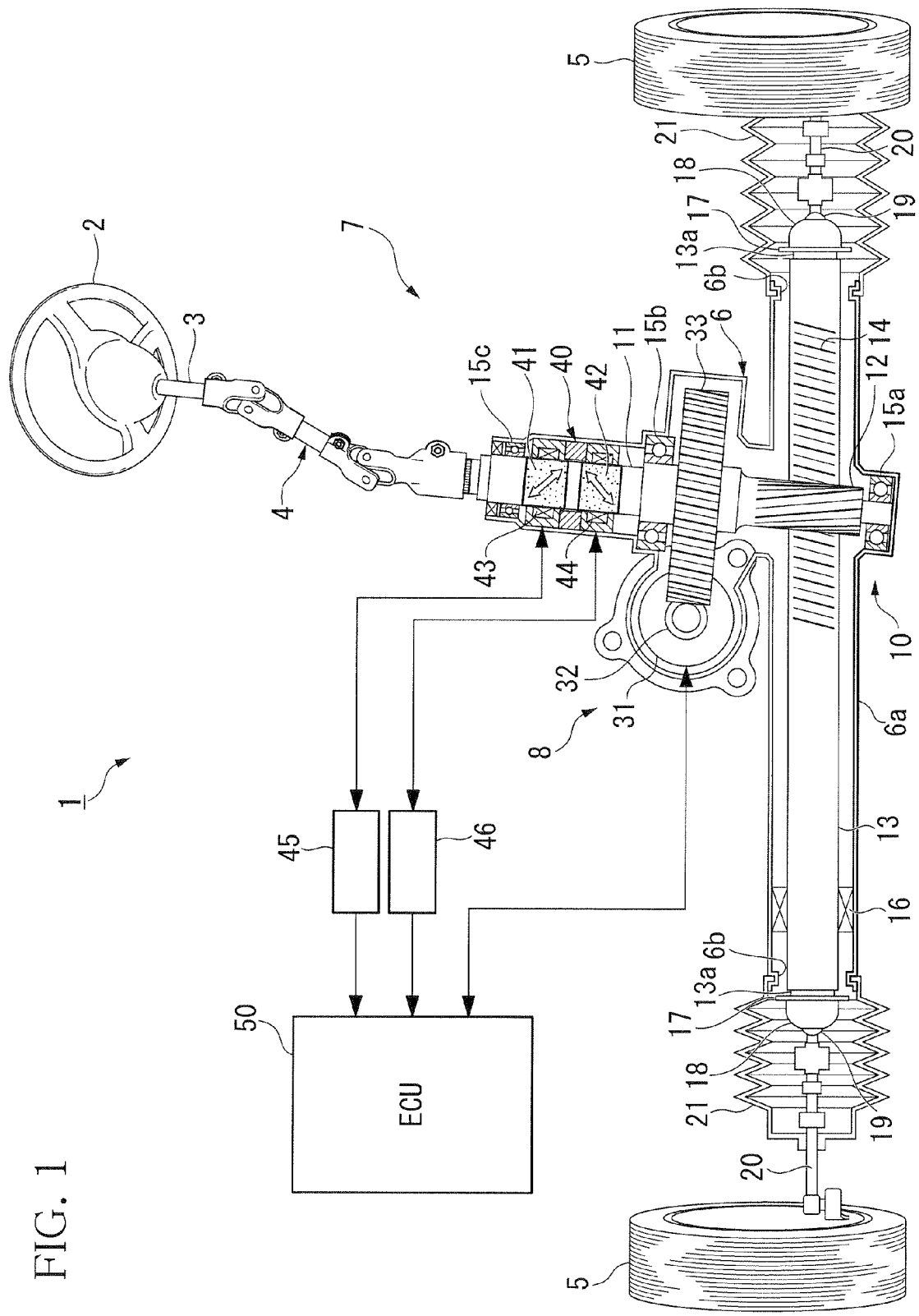
FIG. 1 is a configuration diagram of an electric steering system according to an embodiment of the present invention.

The electric steering system 1 is, for example, shown in FIG. 1. In the steering system from a steering shaft 3, which is connected to a vehicle's steering wheel 2, and the universal coupling 4, which is connected to the steering shaft 3, to wheels (traveling wheels) 5 and 5, there are provided a steering mechanism 7 accommodated in a housing 6 constituting a steering gear box, and a steering assisting mechanism 8 for generating a steering assisting force in the steering mechanism 7.

The steering mechanism 7 includes a rack and pinion mechanism 10, and a pinion shaft 11 of the rack and pinion mechanism 10 is connected to the universal coupling 4.

In addition, a pinion 12, which is provided in the pinion shaft 11, is in meshing engagement with a rack 14 which is provided in a rack shaft 13 capable of reciprocating in a vehicle width direction.

For example, the pinion shaft 11 is supported so that a lower portion, an intermediate portion, and an upper portion thereof are rotatable through shaft bearings 15a, 15b, and 15c, respectively, and the pinion 12 is provided in a lower end portion of the pinion shaft 11.

The rack shaft 13 is provided in a rack housing 6a having a substantially cylindrical shape and extending in a vehicle width direction of the housing 6, and is supported to be able to reciprocate in an axial longitudinal direction through a shaft bearing 16.

Both ends of the rack housing 6a are provided with an opening, and an end portion 13a of the rack shaft 13 protrudes from the opening.

A rack end plate 17 having a larger outer diameter than that of the rack shaft 13 is fixed at each end portion 13a of the rack shaft 13, and a rack end head 18 is fixed on the rack end plate 17.

The rack end head 18 is provided with a ball joint 19, a tie rod 20 is connected to the ball joint 19, and then the wheel (front wheel) 5 is linked to the tie rod 20.

An annular concave groove 6b is formed on an outer circumferential surface in the vicinity of the openings at both ends of the rack housing 6a so as to protrude inward in a radial direction.

The annular concave groove 6b of the rack housing 6a is mounted with an end portion of a rack end cover 21 which has an accordion shape capable of expanding and contracting in an axial longitudinal direction of the rack shaft 13. Further, the end portion 13a of the rack shaft 13, the rack end plate 17, the rack end head 18, and the ball joint 19 are accommodated in the rack end cover 21, and the tie rod 20 protrudes outward through the rack end cover 21.

The steering assisting mechanism 8 includes: a motor 31 including a motor used to generate a steering assisting force for reducing a steering force of the steering wheel 2; a worm gear 32; a worm-wheel gear 33; and a resolver 34. The worm gear 32 and the worm-wheel gear 33 are accommodated in the housing 6 constituting the steering gear box.

The motor 31 is connected to the worm gear 32 axially supported to the housing 6, and the worm gear 32 meshes with the worm-wheel gear 33 integrally formed with the pinion shaft 11. The worm gear 32 and the worm-wheel gear 33 constitute a deceleration mechanism, and a torque, which is generated by the motor 31, is boosted by means of the worm gear 32 and the worm-wheel gear 33 to be thereby transmitted to the pinion shaft 11.

Further, a magnetostrictive steering torque sensor 40, which detects a steering torque (steering input) on the basis of a magnetic characteristic variation caused by magnetostriction, is disposed between the shaft bearing 15b at the intermediate portion and the shaft bearing 15c at the upper portion of the pinion shaft 11.

The steering torque sensor 40 includes: two magnetostrictive films 41 and 42 (for example, magnetostrictive films, such as a Ni—Fe plating, having magnetic anisotropy) which are provided at a predetermined axial distance on an outer circumferential surface of the pinion shaft 11 so as to have oppositely oriented anisotropies; two detecting coils 43 and 44 which are disposed while being opposed to the magnetostrictive films 41 and 42; and detection circuits 45 and 46 which are connected to the detecting coils 43 and 44. Each of the detection circuits 45 and 46 converts each inductance variation of the detecting coils 43 and 44, which is caused by characteristics of inverse magnetostriction generated when a steering torque is applied to the magnetostrictive films 41 and 42, into a voltage variation, and outputs the voltage variation to an ECU (Electric Control Unit) 50. The ECU 50 calculates the steering torque acting on the steering shaft 3 on the basis of the outputs of the respective detection circuits 45 and 46.

The ECU 50 determines a target current to be supplied to the motor 31 in accordance with the magnitude of the steering torque (that is, the steering torque input when a driver steers the steering wheel 2) which is detected by the steering torque sensor 40. Moreover, the ECU 50 makes the current, which is supplied to the motor 31, coincide with the target current, for example, performs a control such as a PID control, thereby generating an assisting torque from the motor 31 in accordance with a steering torque and transmitting the assisting torque to the pinion shaft 11 through the deceleration mechanism. Accordingly, the steering assisting force generated by the motor 31 is applied in the same direction as the driver's steering direction, thereby steering the wheel 5 by means of a combination torque obtained by adding the driver's steering torque to the assisting torque of the motor 31.

Figure 2:
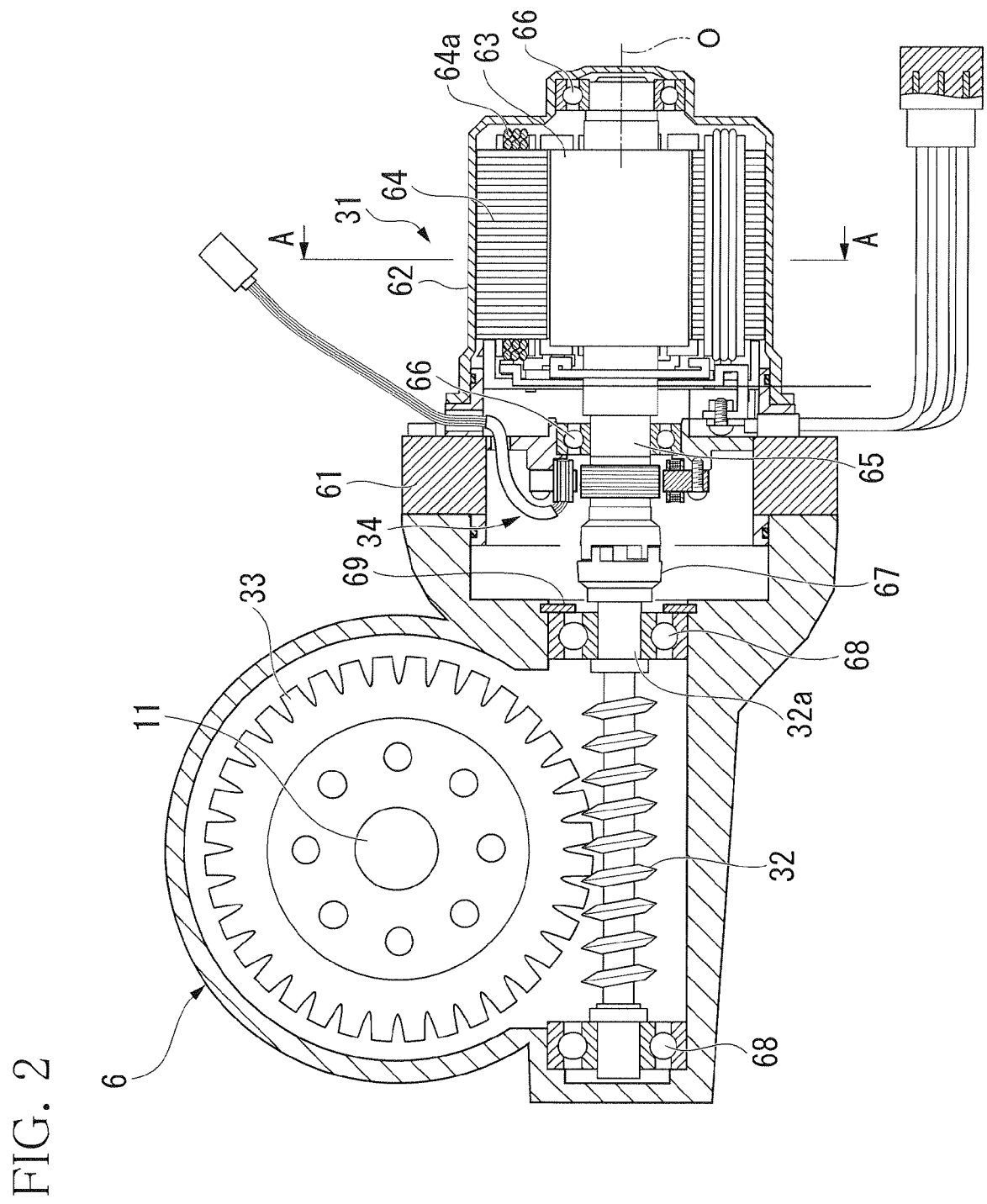
FIG. 2 is a configuration diagram of a steering assisting mechanism of the electric steering system according to an embodiment of the present invention.

For example, as shown in FIG. 2, the motor 31 is mounted on a side portion of the housing 6 by means of bolts so as to protrude from the housing 6. The motor 31 includes: a lid 61 for closing a side opening of the housing 6; a cylindrical motor casing 62 having a bottom mounted to the lid 61 by means of bolts; a rotor 63 provided to be rotatable about a rotary shaft O and having a permanent magnet 63a; a stator 64 covering an outer circumferential portion of the rotor 63 while being opposed thereto in a radial direction and having multiple-phase stator coils 64a for generating a rotary magnetic field rotating the rotor 63.

For example, the stator 64 is accommodated in the motor casing 62 by means of press fit or the like, and an output shaft 65, which is disposed coaxially with the rotary shaft O, is fixed to an inner circumferential portion of the rotor 63.

In addition, the lid 61 and the motor casing 62 of the motor 31 rotatably support the output shaft 65 through two shaft bearings 66.

Figure 3:
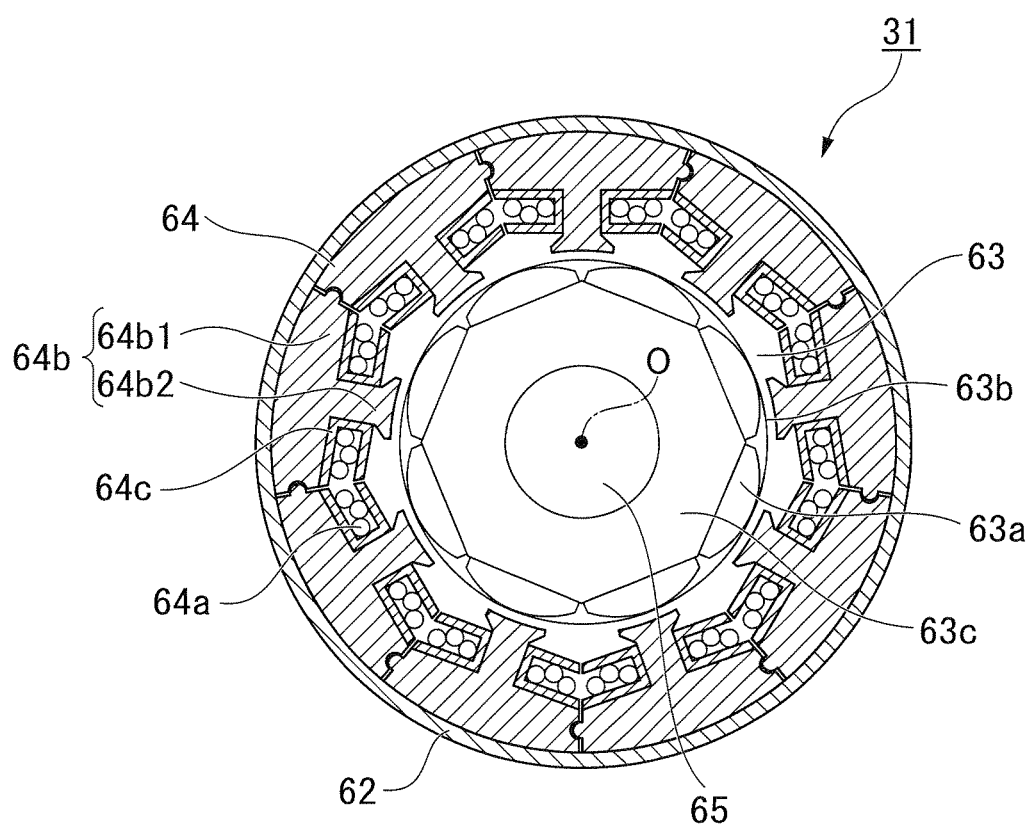
FIG. 3 is a cross-sectional diagram taken along the line A-A shown in FIG. 2.

Additionally, for example, as shown in FIG. 3, the stator 64 of the motor 31 includes a plurality of split cores 64b arranged in an annular pattern, insulation bobbins 64c, and the stator coils 64a multiply wound around the bobbins 64c. For example, the stator 64 is accommodated in the motor casing 62, which is formed by a press-forming process or the like, by press fit or the like.

For example, each split core 64b is formed by laminating a plurality of T-shaped silicon steel sheets along a direction of the rotary shaft O, and includes an outer circumferential-side yoke portion 64b1 and an inner circumferential-side teeth portion 64b2. In both end surfaces of the yoke portion 64b1 in a circumferential direction, one end surface is provided with a convex portion protruding in a circumferential direction and the other end surface is provided with a concave portion to which the convex portion is fitted. In the split cores 64b and 64b adjacent to each other in a circumferential direction, the convex portion of one yoke portion 64b1 is fitted to the concave portion of the other yoke portion 64b1, thereby forming the annular yoke. A width of the teeth portion 64b2 is smaller than that of the yoke portion 64b1 in a circumferential direction, and protrudes from the yoke portion 64b1 to the rotor 63 located inside in a radial direction. The teeth portion 64b2 is mounted with the bobbin 64c formed of, for example, insulation resin material or the like.

Further, for example, the rotor 63 of the motor 31 includes the permanent magnets 63a, a magnet cover 63b, a back yoke 63c, and the output shaft 65.

For example, the back yoke 63c, which has a substantially cylindrical shape, is formed by laminating a plurality of substantially annular silicon steel sheets along a direction of the rotary shaft O. The output shaft 65 is mounted on an inner circumferential portion of the back yoke 63c, and the plurality of permanent magnets 63a is arranged on an outer circumferential surface of the back yoke 63c at a predetermined interval in a circumferential direction. The magnet cover 63b is disposed so as to cover outer circumferential surfaces of the plurality of permanent magnets 63a.

For example, as shown in FIG. 2, the output shaft 65 of the motor 31 is connected to a worm shaft 32a of the worm gear 32 through a coupling 67.

The worm shaft 32a is disposed coaxially with the output shaft 65 of the motor 31 so as to be rotatably supported in the housing 6 through two shaft bearings 68. One shaft bearing 68 on the side of the motor 31 among the two shaft bearings 68, which are mounted in the housing 6, is regulated from moving to the motor 31 in an axial longitudinal direction by a snap ring 69.

Figure 4:
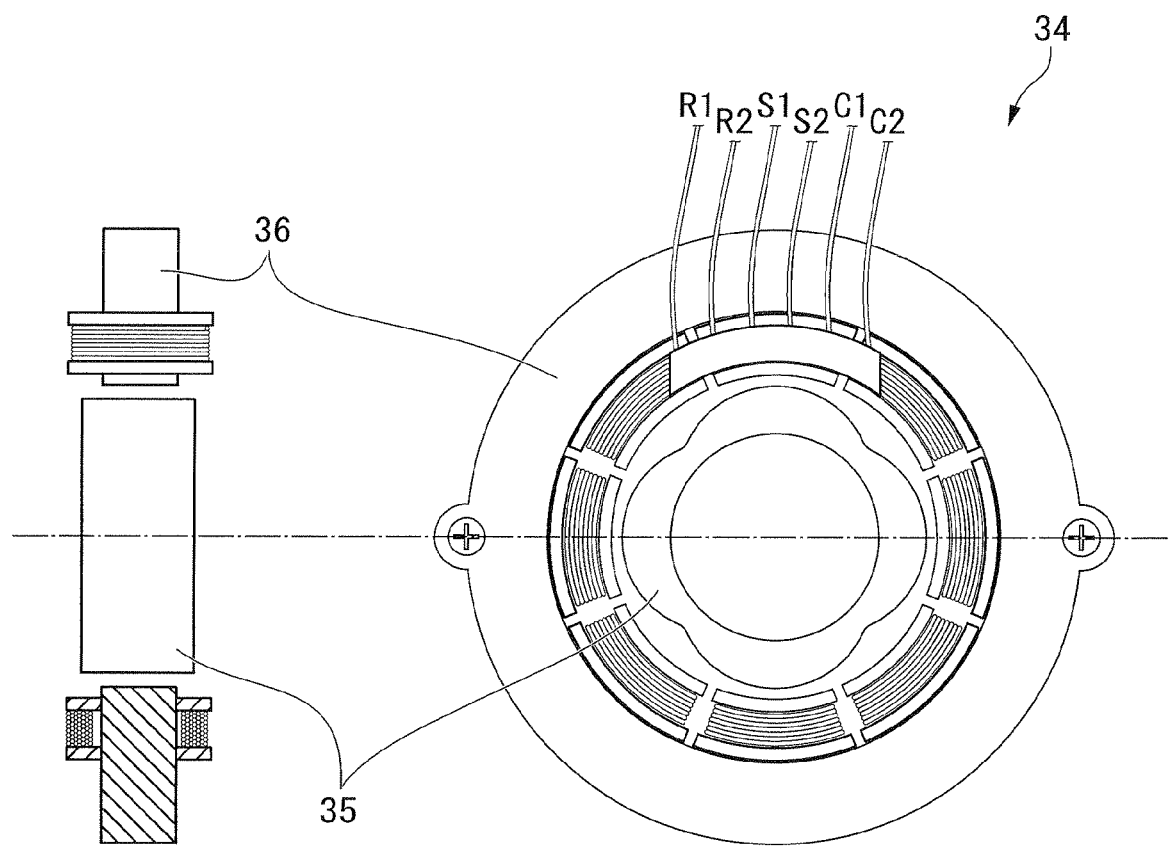
FIG. 4 is a configuration diagram of a resolver according to an embodiment of the present invention.
Figure 5A:
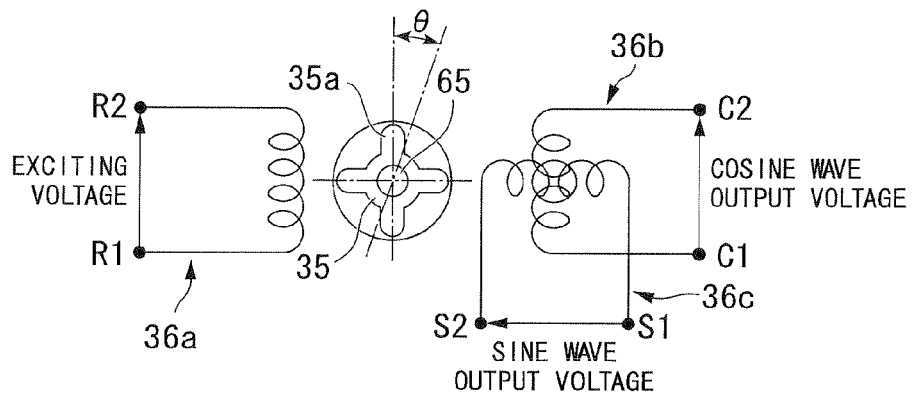
FIG. 5A is a configuration diagram of the resolver according to an embodiment of the present invention.

For example, as shown in FIGS. 2, 4 and 5A, the resolver 34 includes: a resolver rotor 35 which has a salient pole 35a fixed to the rotary shaft 51 of the motor 31; and a resolver stator 36 which has an exciting coil 36a and two first and second output coils 36b and 36c.

Further, for example, as shown in FIG. 5A, the two first and second output coils 36b and 36c are disposed to have a phase difference of 90° therebetween.

Figure 5B:
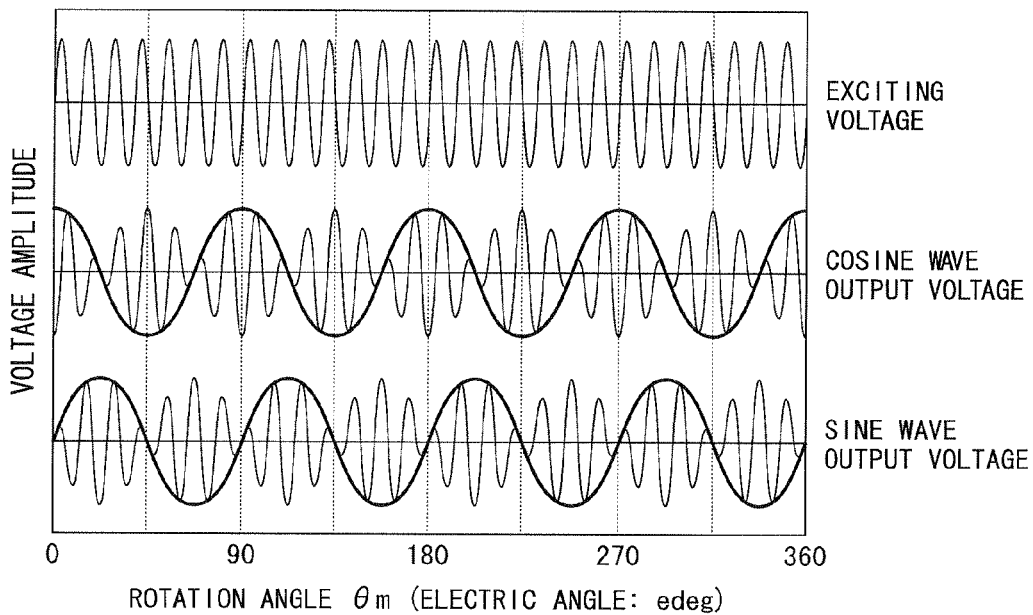
FIG. 5B is a graph illustrating an example of a phase change of a voltage amplitude of the resolver according to an embodiment of the present invention.
Figure 5C:
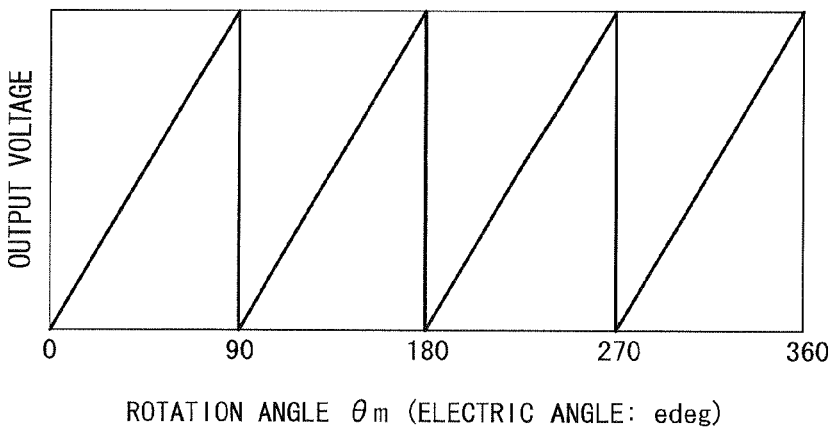
FIG. 5C is a graph illustrating an example of a phase change of an output voltage of the resolver according to an embodiment of the present invention.

Furthermore, for example as shown in FIG. 5B, an exciting voltage of which the voltage amplitude has a sine wave shape may be applied to the exciting coil 36a of the resolver 34. In this case, in accordance with the rotation (that is, the rotation of the rotary shaft 65 of the motor 31) of the resolver rotor 35, a cosine wave output voltage and a sine wave output voltage as envelopes of the voltage amplitudes corresponding to the rotation angle θm are induced in the first and second output coils 36b and 36c. The cosine wave output voltage and the sine wave output voltage are detected by an RD conversion process, and the ratio tan θ, which is the ratio of the sine wave output voltage and the cosine wave output voltage, is calculated. Thereby, for example as shown in FIG. 5C, on the basis of the arctangent value $\tan^{-1}$ of the ratio tan θ, the rotation angle θm is calculated.

Figure 6:
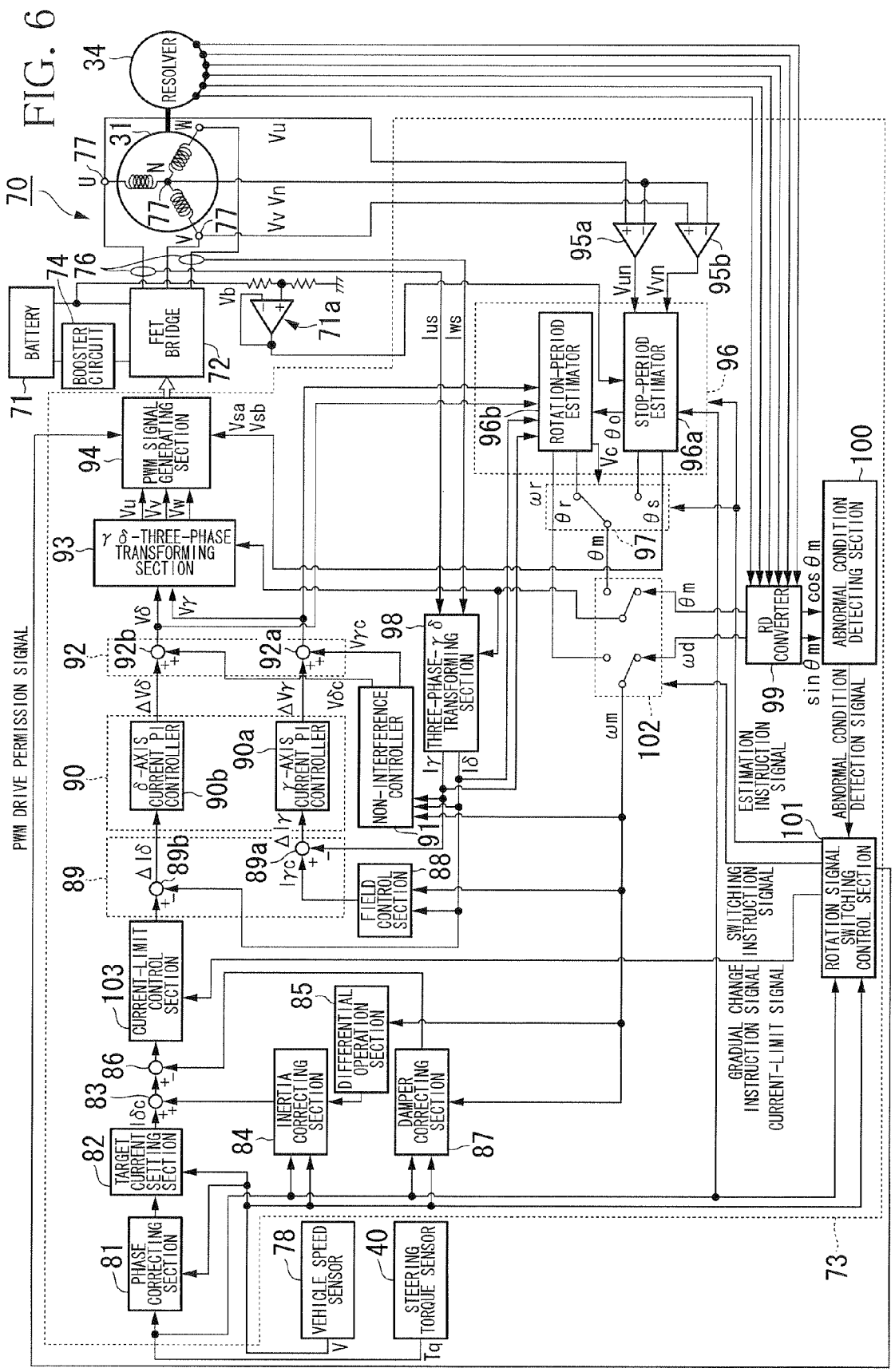
FIG. 6 is a configuration diagram of a motor control device according to an embodiment of the invention.

In the electric steering system 1 according to the embodiment, for example, as shown in FIG. 6, a motor control device 70 includes an FET bridge 72 using a battery 71 as a DC power source and a control unit 73, and is provided in the ECU 50.

In the motor control device 70, the motor 31 is driven by the FET bridge 72 upon receiving a control command output from the control unit 73.

Figure 7:
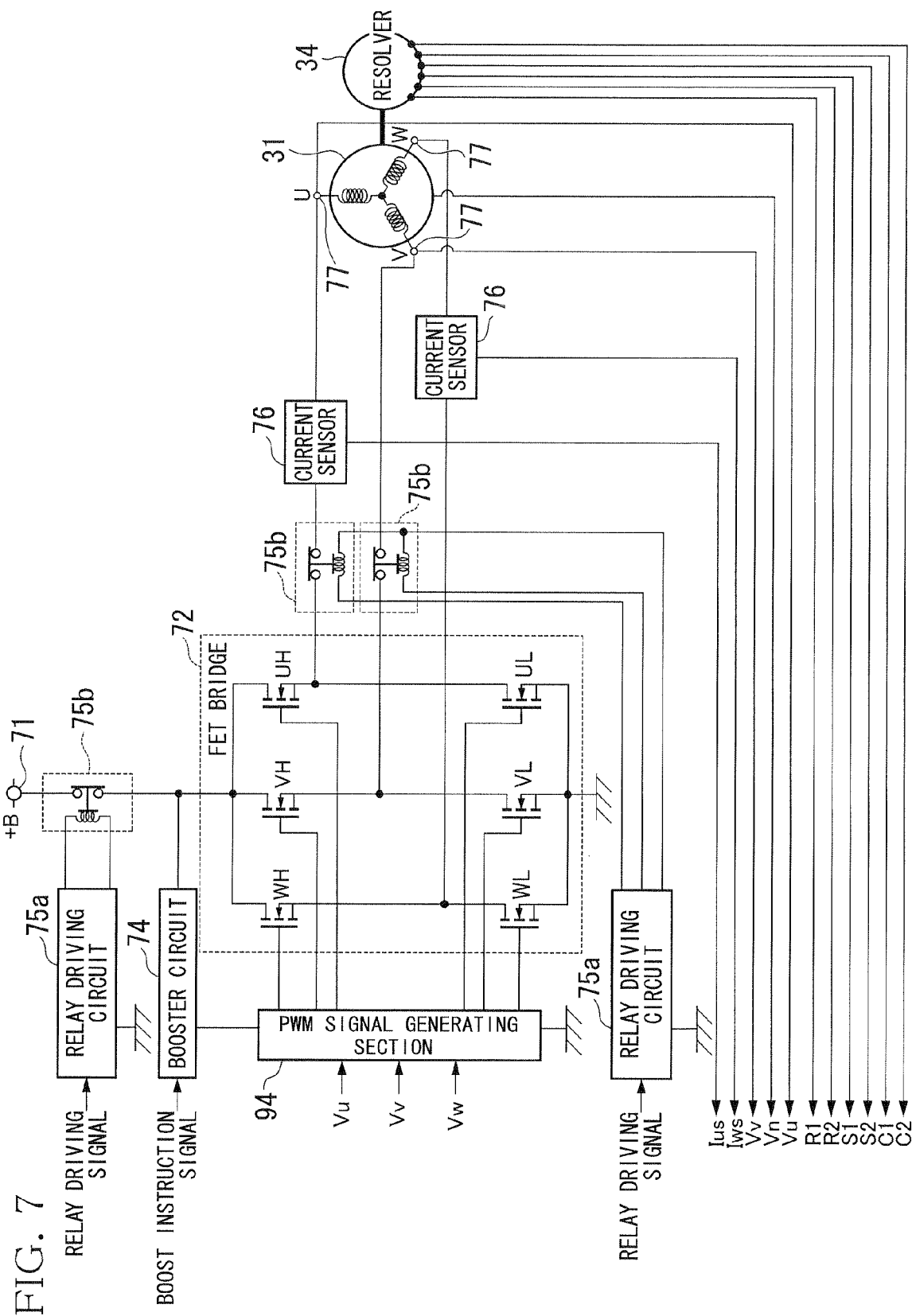
FIG. 7 is a configuration diagram of an FET bridge shown in FIG. 6.

For example, as shown in FIG. 7, the FET bridge 72 includes a bridge circuit having a plurality of FETs (for example, MOSFET: Metal Oxide Semi-conductor Field Effect Transistor) connected in a bridge configuration, and the bridge circuit is driven by a signal subjected to a pulse width modulation (PWM).

For example, the bridge circuit is formed in such a manner that high-side and low-side U-phase transistors UH and UL, high-side and low-side V-phase transistors VH and VL, and high-side and low-side W-phase transistors WH and WL corresponding to each phase are connected to each other in a bridge. Further, each drain of the transistors UH, VH, and WH is connected to the battery 71 (+B) to form a high-side arm and each source of the transistors UL, VL, and WL is grounded to form a low-side arm. Furthermore, in each phase, each source of the transistors UH, VH, and WH of the high-side arm is connected to each drain of the transistors UL, VL, and WL of the low-side arm.

For example, when driving the motor 31, the FET bridge 72 changes an ON/OFF (connected/disconnected) state of each transistor corresponding to each phase on the basis of a gate signal (that is, a PWM signal) as a switching command which is output from the control unit 73 and is input to each gate of the transistors UH, VH, WH, UL, VL, and WL. Thereby, the FET bridge 72 converts a DC power, which is supplied from the battery 71, into a three-phase AC power, and sequentially supplies a current to the three-phase stator coils 64a due to commutation. Accordingly, an AC U-phase current Iu, an AC V-phase current Iv, and an AC W-phase current Iw are made to flow to the respective phase stator coils 64a.

A booster circuit 74 includes, for example, a capacitor and a charge pump circuit having a transistor. The control unit 73 inputs a gate signal (that is, a signal for instructing a boost operation of the booster circuit 74) for changing the ON/OFF (connected/disconnected) state of the transistors.

The booster circuit 74 boosts each gate voltage of the transistors UH, VH, and WH constituting the high-side arm of the FET bridge 72.

Further, relays 75b opened and closed by a relay driving circuit 75a are provided between the battery 71 and the FET bridge 72 and the booster circuit 74 and between the FET bridge 72 and the stator coils 64a and 64a of any two phases (for example, U phase and V phase) of the three phases of the motor 31. In addition, the control unit 73 inputs a relay driving signal for controlling an opening/closing operation of the relay 75b to the relay driving circuit 75a.

In the control unit 73, a feedback control (a vector control) of current is performed on a γ-δ coordinate forming a rotated orthogonal coordinate. For example, the target δ-axis current Iδc is calculated from the vehicle speed V which is output from a vehicle speed sensor 78, a signal (torque detection signal Tq) which is output from the steering torque sensor 40 in response to the steering torque input when the driver steers the steering wheel 2, and the like. Further, the target γ-axis current Iγc is calculated from the δ-axis current Iδ, the rotation speed ωm (=dθm/dt) of the motor 31, and the like. In addition, on the basis of the target γ-axis current Iγc and the target δ-axis current Iδc, the three-phase output voltages Vu, Vv, and Vw are calculated, and a PWM signal as a gate signal is input to the FET bridge 72 in accordance with the phase output voltages Vu, Vv, and Vw. Also, the control is performed to make zero the deviation between the target γ-axis and δ-axis currents Iγc and Iδc and the γ-axis and δ-axis currents Iγ and Iδ obtained by converting the detection values of the phase currents Iu, Iv, and Iw, which are actually supplied from the FET bridge 72 to the motor 31, into the γ-δ coordinate. The feedback control of current on the γ-δ coordinate will be described later in detail.

For example, when starting the motor 31, in order to supply a current having a sine wave shape, the control unit 73 compares the phase output voltages Vu, Vv, and Vw with a carrier signal such as a triangular wave, thereby generating the gate signal (that is, the PWM signal) for turning on/off the transistors UH, VH, WH, UL, VL, and WL of the FET bridge 72. Then, The FET bridge 72 changes an ON/OFF (connected/disconnected) state of each transistor corresponding to each of the three phases. In accordance with this change, the DC power, which is supplied from the battery 71, is converted into the three-phase AC power. Then, the current is sequentially supplied to the stator coils 64a of the three-phase motor 31 due to commutation, thereby supplying the AC U-phase current Iu, the AC V-phase current Iv, and the AC W-phase current Iw to the stator coils 64a.

In addition, the control unit 73 stores, in advance, a duty of the PWM signal for turning on/off driving of each of the transistors UH and UL, VH and VL, and WH and WL based on the pulse width modulation (PWM), that is, an ON/OFF ratio map (data).

The control unit 73 receives an input of a detection signal (for example, a U-phase detection current Ius, a W-phase detection current Iws, or the like) which is output from a current sensor 76 for detecting at least any two (for example, the U-phase current Iu, the W-phase current Iw, and the like) of the phase currents Iu, Iv, and Iw supplied from the FET bridge 72 to the respective phase stator coils 64a of the motor 31. The control unit 73 also receives an input of a detection signal which is output from a voltage sensor 77 for detecting at least any two (for example, the U-phase voltage Vu, the V-phase voltage Vv, and the like) of the phase output voltages Vu, Vv, and Vw necessary for estimating a rotation angle θm (that is, a rotation angle of a magnetic pole of the rotor 63 from a predetermined reference rotation position, and a rotation position of the output shaft 65 of the motor 31) at the time of the stoppage of the rotor 63 of the motor 31 used for, for example, a coordinate conversion or the like, and for detecting a voltage (a middle-point voltage) Vn of a middle point connected to the multiple-phase stator coils 64a of the motor 31. The control unit 73 also receives an input of a detection signal which is output from the vehicle speed sensor 78 for detecting the speed of the vehicle (the vehicle speed) V.

The control unit 73 includes: for example, a phase correcting section 81; a target current setting section 82; a first correction computing section 83; an inertia correcting section 84; a differential operation section 85; a second correction computing section 86; a damper correcting section 87; a field control section 88; a current deviation calculating section 89; a current control section 90; a non-interference controller 91; a voltage correcting section 92; a γδ-three-phase transforming section 93; a PWM signal generating section 94; first and second phase-to-phase voltage calculating sections 95a and 95b; a rotation angle estimator 96; a switching section 97; a three-phase-γδ transforming section 98; an RD converter 99; an abnormal condition detecting section 100; a rotation signal switching control section 101; a rotation signal switch 102; and a current-limit control section 103.

The phase correcting section 81 performs a phase correction process on the torque detection signal Tq, which is output from the steering torque sensor 40, for each vehicle speed V which is output from the vehicle speed sensor 78.

The target current setting section 82 calculates the current command for specifying the phase currents Iu, Iv, and Iw, which are supplied from the FET bridge 72 to the motor 31, on the basis of the torque detection signal Tq which is subjected to the phase correction process in the phase correcting section 81 and the vehicle speed V which is output from the vehicle speed sensor 78. The current command is particularly the δ-axis target current Iδc among the γ-axis target current Iγc and the δ-axis target current Iδc on the rotated orthogonal coordinate.

In addition, the γ-δ coordinate forming the rotated orthogonal coordinate rotates in synchronization with the rotary phase of the rotor 63, where the γ-axis (the field axis) represents a magnetic-flux direction of a field pole by the permanent magnet of the rotor 63 and the δ-axis (the torque axis) represents a direction orthogonal to the γ-axis, for example. Accordingly, as a current command for an AC signal supplied from the FET bridge 72 to each phase of the motor 31, the γ-axis target current Iγc and the δ-axis target current Iδc as DC signals are supplied.

The first correction computing section 83 newly outputs the value, which is obtained by adding an inertia correction term output from the inertia correcting section 84 to the δ-axis target current Iδc calculated in the target current setting section 82, as a δ-axis target current Iδc.

The inertia correcting section 84 calculates the inertia correction term relating to the moment of inertia on, for example, the basis of the torque detection signal Tq which is output from the steering torque sensor 40, the vehicle speed V which is output from the vehicle speed sensor 78, and the temporal differential value (=dωm/dt) of the rotation speed ωm (=dθm/dt) which is output from the differential operation section 85.

In addition, as the rotation speed corn, an estimate rotation number ωr, which is output from a rotation-period estimator 96b to be described later, or a detection rotation number ωd, which is output from the RD converter 99, to be described later is used.

The second correction computing section 86 newly outputs the value, which is obtained by subtracting a damper correction term output from the damper correcting section 87 from the δ-axis target current Iδc corrected in the first correction computing section 83, as a δ-axis target current Iδc.

The damper correcting section 87 calculates the damper correction term relating to the damping coefficient on, for example, the basis of the torque detection signal Tq which is output from the steering torque sensor 40, the vehicle speed V which is output from the vehicle speed sensor 78, and the rotation speed ωm (=dθm/dt) which is output from the differential operation section 85.

The current-limit control section 103 makes zero the value of the δ-axis target current Iδc which is output to the current deviation calculating section 89 in accordance with the current-limit signal which is output from a rotation signal switching control section 101 to be described later.

Further, in response to a gradual change instruction signal which is output from a rotation signal switching control section 101 to be described later, that is, a signal for instructing an increase in the value of the δ-axis target current Iδc from zero gradually, the current-limit control section 103 changes the value of the δ-axis target current Iδc, which is output to the current deviation calculating section 89, so as to gradually increase the value from zero to the value of the δ-axis target current Iδc which is output from the second correction computing section 86.

In addition, when the current-limit signal or the gradual change instruction signal is not output from the rotation signal switching control section 101 to be described later, the current-limit control section 103 does not change the value of the δ-axis target current Iδc which is output from the second correction computing section 86, and outputs the value to the current deviation calculating section 89.

For example, the field control section 88 performs correction, in order to suppress the increase in the inverse voltage according to the increase in the rotation speed corn of the motor 31, by setting the target value of the weak field current of the weak field control for controlling the current phase to the γ-axis correction current so as to equivalently decrease the amount of the field of the rotor 63. That is, the field control section 88 obtains the γ-axis correction current by further correcting, on the basis of the rotation speed ωm, the γ-axis target current Iγc calculated on the basis of the δ-axis current Iδ which is output from the three-phase-γδ transforming section 98 to be described later, and newly outputs the γ-axis correction current as the γ-axis target current Iγc.

The current deviation calculating section 89 includes a γ-axis current deviation calculating portion 89a for calculating a deviation ΔIγ between the γ-axis target current Iγc and the γ-axis current Iγ, and a δ-axis current deviation calculating portion 89b for calculating a deviation ΔIδ between the δ-axis target current Iδc and the δ-axis current Iδ.

In addition, the γ-axis current Iγ and the δ-axis current Iδ is output from the three-phase-γδ transforming section 98 for calculating the γ-axis current Iγ and the δ-axis current Iδ by converting the detected values of the phase currents Iu, Iv, and Iw into values on the γ-δ coordinate.

The current control section 90 includes a γ-axis current PI controller 90a for calculating a γ-axis voltage command value ΔVγ by controlling and amplifying the deviation ΔIγ and a δ-axis current PI controller 90b for calculating a δ-axis voltage command value ΔVδ by controlling and amplifying the deviation ΔIδ by means of, for example, a PID (Proportional-Integral-Derivative) operation.

Further, the non-interference controller 91 calculates a γ-axis compensation term Vγc (=ωr·Lq·Iδ) and a δ-axis compensation term Vδc (=ωr·Lq·Iγ), which cancel interference components for the γ axis and the δ axis in order to independently control the γ axis and the δ axis by canceling speed electromotive force components which interfere between the γ axis and the δ axis on the basis of, for example, the γ-axis current Iγ, the δ-axis current Iδ, the γ-axis inductance Lγ (which may be replaced with the d-axis inductance Ld to be described later) and the δ-axis inductance Lδ (which may be replaced with the q-axis inductance Lq to be described later) which are stored in advance, and the rotation speed ωm (equivalent to the estimate rotation number ωr) which is output from the rotation-period estimator 96b of the rotation angle estimator 96 to be described later.

The voltage correcting section 92 includes a γ-axis voltage calculating portion 92a for obtaining a γ-axis voltage command value Vγ by adding the γ-axis compensation term Vγc to the γ-axis voltage command value ΔVγ and a δ-axis voltage calculating portion 92b for obtaining a δ-axis voltage command value Vδ by adding the δ-axis compensation term Vδc to the δ-axis voltage command value ΔVδ.

The γδ-three-phase converting section 93 converts, on the basis of the rotation angle θm corresponding to the rotation position of the motor 31 output from the rotation signal switch 102, the γ-axis voltage command value Vγ and the δ-axis voltage command value Vδ on the γ-δ coordinate into the U-phase output voltage Vu, the V-phase output voltage Vv, and the W-phase output voltage Vw which are voltage command values on the three-phase AC coordinate as a stationary coordinate.

In response to a PWM drive permission signal which is output from the rotation signal switching control section 101, that is, a signal which permits PWM drive of the motor 31, to be described later, the PWM signal generating section 94 compares the phase output voltages Vu, Vv, and Vw with a carrier signal such as a triangular wave, and generates the gate signal (that is, the PWM signal) for turning on/off the transistors UH, VH, WH, UL, VL, and WL of the FET bridge 72 in order to supply a current having a sine wave shape to the motor 31.

Further, the PWM signal generating section 94 outputs a predetermined gate signal formed of pulses for turning on/off the transistors UH, VH, WH, UL, VL, and WL of the FET bridge 72 in response to, for example, a command signal Vsa which is output from the stop-period estimator 96a of the rotation angle estimator 96 to be described later at the time of estimating the rotation angle in a stopped state of the motor 31. The predetermined gate signal instructs the FET bridge 72 to apply, in a current-supplying pattern shown in FIGS. 8A and 8B, an AC voltage of a predetermined rectangular wave between the phase terminals (for example, between the U-phase terminal and the V-phase terminal) of the motor 31. The AC voltage of the predetermined rectangular wave includes, for example: an AC voltage of a rectangular wave of a predetermined voltage value (for example, 12 V or the like) having a frequency (for example, 40 kHz or the like) double the PWM frequency (for example, 20 kHz or the like) at the time of driving the motor 31 as a frequency other than the audio frequency; or an AC voltage (for example, 12 V or the like) of a rectangular wave of a pulse phase (for example, about 10 μsec).

For example, the PWM signal generating section 94 may receive an input of a command signal Vsb, which is output from the stop-period estimator 96a of the rotation angle estimator 96 to be described later, even when selecting a single estimate value from a plurality of candidates of the rotation angle θm as described later at the time of estimating a rotation angle in the stopped state of the motor 31. In this case, the PWM signal generating section 94 outputs the predetermined gate signal formed of pulses for turning on/off the transistors UH, VH, WH, UL, VL, and WL of the FET bridge 72 in accordance with the phase output voltages Vu, Vv, and Vw which are generated by the steering torque.

Specifically, when a single estimate value θm is selected from a plurality of candidates of the rotation angle θm to be described later as a temporary estimate value, the predetermined gate signal instructs the FET bridge 72 to drive the motor 31 by supplying a predetermined minute current in an assisting dead zone by use of the temporary estimate value, thereby determining whether or not the temporary estimate value is correct depending on whether or not the steering assisting force is applied by the motor 31 in the same direction as that of the driver's steering input. If the temporary estimate value is correct, from the time point at which the steering torque exceeds the range within the assisting dead zone, the assist is performed by controlling the driving of the motor on the basis of the estimate value. If the temporary estimate value is not correct, the assist is performed by controlling the driving of the motor on the basis of another estimate value. The detailed description will be given later.

Further, the PWM signal generating section 94 outputs a signal (for example, the gate signal or the like for changing the ON/OFF (connected/disconnected) state of each transistor of the charge pump circuit provided in the booster circuit 74) for instructing the boost operation of the booster circuit 74.

Furthermore, when the PWM drive permission signal is not output from the rotation signal switching control section 101 to be described later, the PWM signal generating section 94 outputs a gate signal for instructing the stoppage of the current supply to the motor 31.

The first and second phase-to-phase voltage calculating sections 95a and 95b are provided with an operational amplifier. On the basis of the phase voltages Vu and Vv and the middle-point voltage Vn detected by the voltage sensors 77, the first phase-to-phase voltage calculating section 95a calculates a U-phase-to-phase voltage Vun (=Vu−Vn), and the second phase-to-phase voltage calculating section 95b calculates a V-phase-to-phase voltage Vvn (=Vv−Vn).

The rotation angle estimator 96 includes the stop-period estimator 96a and the rotation-period estimator 96b which operate in response to the estimation instruction signal output from the rotation signal switching control section 101 to be described later.

In addition, the switching section 97 selects, in accordance with the state of the motor 31, either the stop-period estimator 96a or the rotation-period estimator 96b, thereby outputting the stop-period rotation angle θs, which is output from the stop-period estimator 96a, or the rotation-period estimate rotation angle θr, which is output from the rotation-period estimator 96b, as the rotation angle θm.

For example, the switching section 97 selects the stop-period estimator 96a at the time of the stoppage of the motor 31, and selects the rotation-period estimator 96b at the time of rotation of the motor 31.

Figure 17:
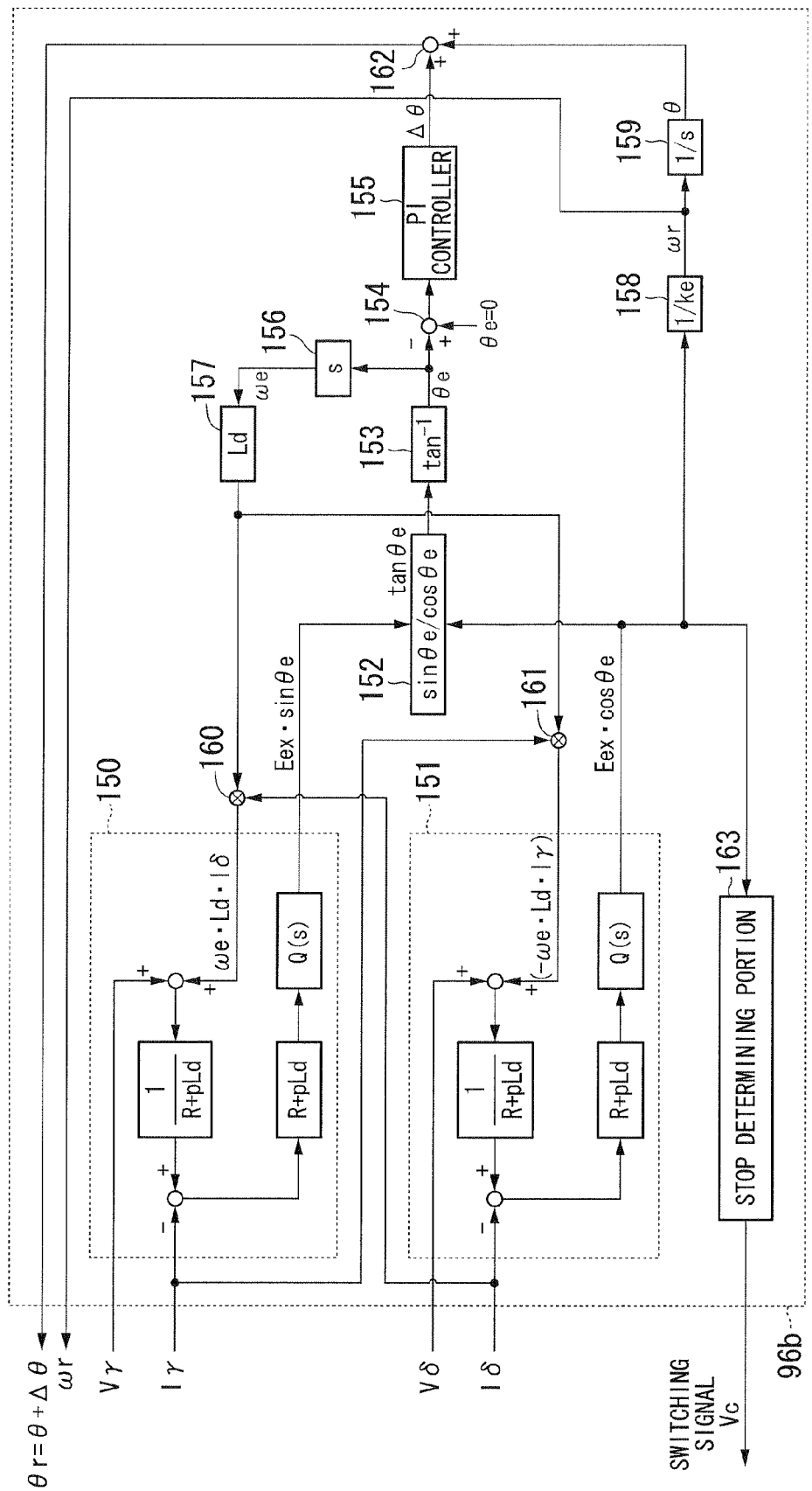
FIG. 17 is a block configuration diagram of a rotation-period estimator according to an embodiment of the present invention.

The switching section 97 switches the output from the stop-period estimator 96a and the output from the rotation-period estimator 96b, on the basis of the switching signal which is output from a stop determining portion 163 of FIG. 17 to be described later in the rotation-period estimator 96b. Specifically, when the magnitude (Eex·cos θe) of the induced voltage shown in FIG. 17 is smaller than a predetermined value, the stop determining portion 163 determines that the motor 31 is stopping, and generates a signal for selecting the stop-period estimator 96a. In contrast, when the magnitude (Eex·cos θe) of the above-mentioned induced voltage is larger than the predetermined value, the stop determining portion 163 determines that the motor 31 is rotating, and generates a signal for selecting the rotation-period estimator 96b.

The stop-period estimator 96a of the rotation angle estimator 96 estimates the stop-period rotation angle θs by using the change of the inductance of the motor 31 caused by the rotation angle θm at the time of the stoppage of the motor 31.

Further, the rotation-period estimator 96b of the rotation angle estimator 96 estimates the rotation-period estimate rotation angle θr by using the change of the induced voltage generated by the motor 31 depending on the rotation speed ωm at the time of the rotation of the motor 31.

Specifically, the stop-period estimator 96a of the rotation angle estimator 96 selects a plurality of candidates of the stop-period rotation angle θs in accordance with the phase-to-phase voltages Vun and Vvn which are output from the first and second phase-to-phase voltage calculating sections 95a and 95b. A single estimate value is selected as a temporary estimate value from the plurality of candidates. By using the temporary estimate value, the FET bridge 72 is instructed to drive the motor 31 by supplying a predetermined minute current in the assisting dead zone. At this time, it is determined whether or not the temporary estimate value is correct depending on whether or not the steering assisting force of the motor 31 is applied in the same direction as that of the driver's steering input from the torque detection signal Tq output from the steering torque sensor 40. If the temporary estimate value is correct, the value is output as the estimate value of the stop-period rotation angle θs, and from the time point at which the steering torque becomes out of the range within the assisting dead zone, the assist is performed by controlling the driving of the motor 31 on the basis of the estimate value. If the temporary estimate value is not correct, another estimate value is output, and from the time point at which the steering torque becomes out of the range within the assisting dead zone, the assist is performed by controlling the driving of the motor 31 on the basis of the estimate value.

Specifically, on the basis of the magnitude (Eex·cos θe) of the induced voltage which is output from the δ-axis induced voltage estimating portion 151 of FIG. 17 to be described later in the rotation-period estimator 96b, when the value of the induced voltage generated by the rotation of the motor 31 is smaller than the predetermined value, the stop determining portion 163 of FIG. 17 estimates that the motor 31 is stopped, and outputs a switching signal.

Then, the switching section 97 selects rotation angle estimation performed by the stop-period estimator 96a.

Figure 8A:
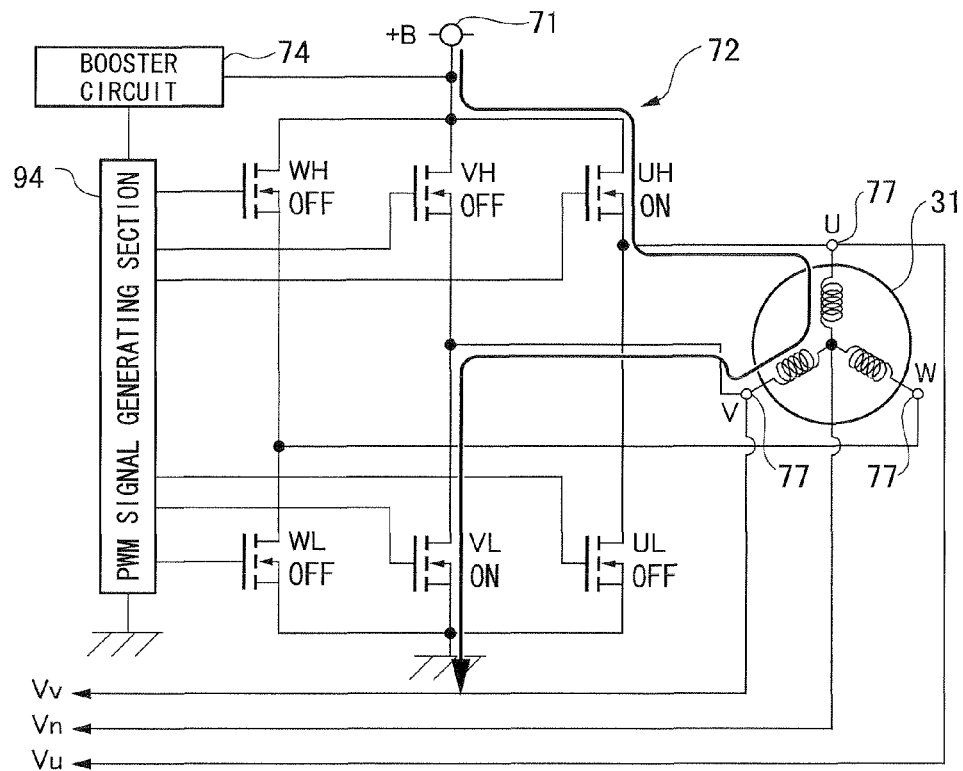
FIG. 8A is a diagram illustrating an ON (connected) state of each transistor of the FET bridge shown in FIG. 6.
Figure 8B:
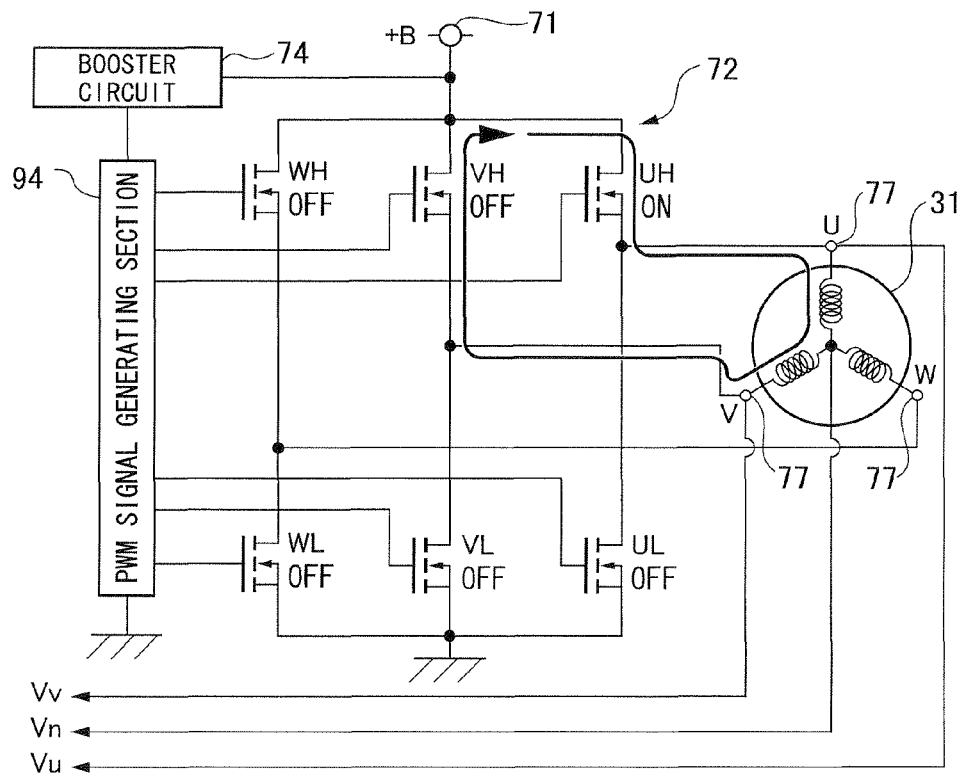
FIG. 8B is a diagram illustrating an OFF (disconnected) state of each transistor of the FET bridge shown in FIG. 6.

For example, at the time of estimating the rotation angle in the stopped state of the motor 31, the motor 31 is driven by repeating the following two states of the transistors UH, VH, WH, UL, VL, and WL of the FET bridge 72. In one state, for example as shown in FIG. 8A, the high-side U-phase transistor UH and the low-side V-phase transistor VL are turned on, while the other transistors VH, WH, UL, and WL are turned off. In the other state, for example as shown in FIG. 8B, the high-side U-phase transistor UH is turned on, while the other transistors VH, WH, UL, VL, and WL are turned off. In this manner, the command signal Vsa for instructing the application of the AC voltage of the predetermined rectangular wave (for example, 40 kHz and 12 V) between the U-phase terminal and the V-phase terminal of the motor 31 is output.

Alternatively, the current-supplying pattern state shown in FIG. 8A is achieved once, and then the current-supplying pattern state shown in FIG. 8B is achieved once. In this manner, the command signal Vsa for instructing the application of the AC voltage (for example, 12 V or the like) of the rectangular wave of the pulse shape (for example, about 10 µsec) is output.

Then, on the basis of the ratio (phase-to-phase voltage ratio) Vun/Vvn between the U-phase-to-phase voltage Vun and the V-phase-to-phase voltage Vvn at the time of applying the predetermined rectangular wave between the U-phase terminal and the V-phase terminal of the motor 31, the stop-period rotation angle θs is acquired by searching, for example, a predetermined first map which is set in advance.

Figure 9:
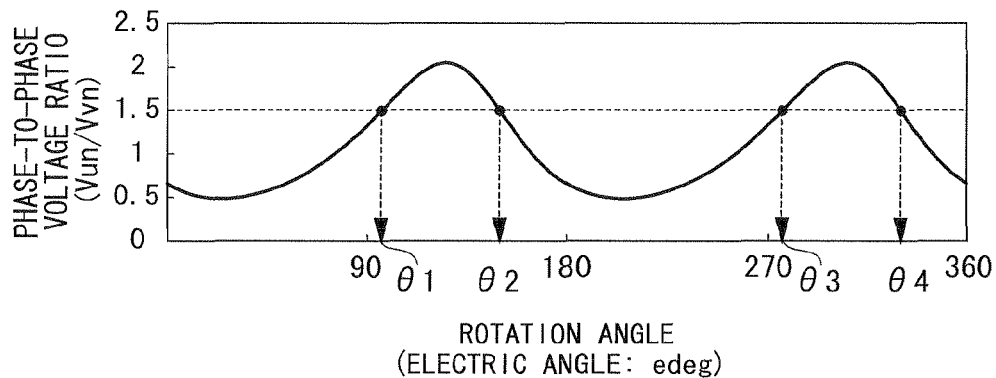
FIG. 9 is a graph illustrating a correspondence relationship between a rotation angle $\theta m$ and a phase-to-phase voltage ratio Vun/Vvn according to an embodiment of the present invention.

In addition, the first map is, for example, a map showing a predetermined correspondence relationship between the phase-to-phase voltage ratio Vun/Vvn and the stop-period rotation angle θs. For example, as shown in FIG. 9, in the range of 0° to 360° in an electric angle (edeg), four values θ1, ..., θ4 of the stop-period rotation angle θs correspond to the appropriate single value of the phase-to-phase voltage ratio Vun/Vvn. That is, two cycles of the phase-to-phase voltage ratio Vun/Vvn correspond to 360° in the electric angle (edeg).

For example, in the case of the phase-to-phase voltage ratio Vun/Vvn=1.5, the stop-period rotation angles θs=θ1 (=100°), θ2 (=150°), θ3 (=280°), and θ4 (=330°) correspond thereto.

In addition, the stop-period estimator 96a selects any two of the four values θ1, ..., θ4 of the stop-period rotation angle θs found by searching on the basis of the first map by searching, for example, a predetermined second map set in advance on the basis of the V-phase-to-phase voltage Vvn at the time of applying the predetermined rectangular wave between the U-phase terminal and the V-phase terminal of the motor 31.

Figure 10:
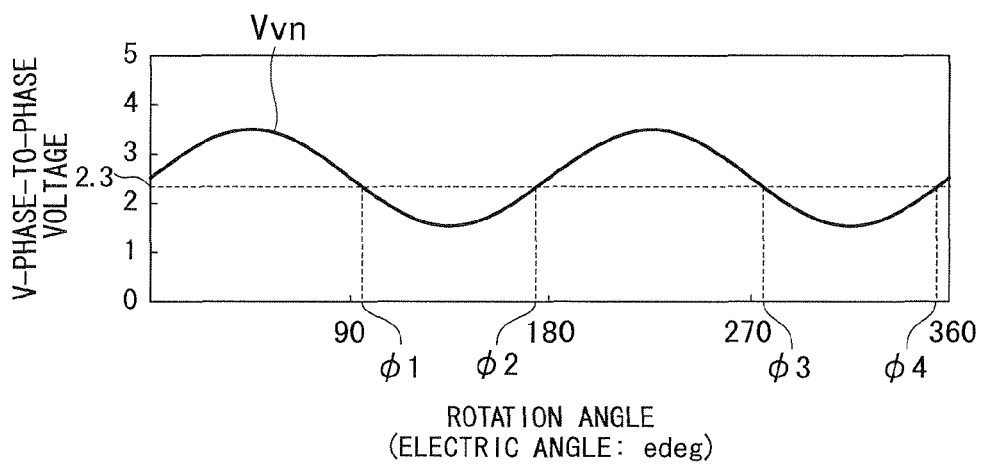
FIG. 10 is a graph illustrating a correspondence relationship between a rotation angle $\theta m$ and a phase-to-phase voltage Vvn according to an embodiment of the present invention.

The second map is, for example, a map showing a predetermined correspondence relationship between the V-phase-to-phase voltage Vvn and the stop-period rotation angle θs. For example, as shown in FIG. 10, in the range of 0° to 360° in the electric angle (edeg), four values φ1, ..., φ4 of the stop-period rotation angle θs correspond to the appropriate single value of the V-phase-to-phase voltage Vvn. That is, two cycles of each phase-to-phase voltage Vvn correspond to 360° in the electric angle (edeg).

In addition, in order to obtain the accurate stop-period rotation angle θs even when a battery voltage (that is, a power source voltage of the FET bridge 72) varies, a battery voltage Vb is detected. By use of this value, the V-phase-to-phase voltage Vvn is corrected, and by use of the corrected V-phase-to-phase voltage Vvn, the second map is searched, thereby obtaining the four values φ1, ..., φ4 of the stop-period rotation angle θs. Hence, for example, as shown in FIG. 6, a voltage follower circuit 71a having an operational amplifier is provided between the stop-period estimator 96a and the battery 71 (+B), and the output of the voltage follower circuit 71a is input to the stop-period estimator 96a.

For example, the V-phase-to-phase voltage may be Vvn=2.3 (V) when the phase-to-phase voltage ratio Vun/Vvn=1.5 can be obtained. In this case, the rotation angle satisfying the V-phase-to-phase voltage Vvn corresponds to the stop-period rotation angles θs=φ1 (=100°), φ2 (=175°), φ3 (=280°), and φ4 (=355°).

Hence, when the four values θ1 (=100°), θ2 (=150°), θ3 (=280°), and θ4 (=330°) of the stop-period rotation angle θs are found by searching on the basis of the first map, two values θ1 (=100°) and θ3 (=280°) of the stop-period rotation angle θs equal to the searching result of the second map are selected as the estimate value candidates.

In addition, regarding the switching of the current supply performed by the FET bridge 72, for example, when current is supplied to the U-phase and V-phase stator coils 64a as shown in FIGS. 8A and 8B, the current supplied to the U-phase stator coil 64a becomes equal to that supplied to the V-phase stator coil 64a. From this point, the phase-to-phase voltage ratio Vun/Vvn becomes equal to an impedance ratio Zun/Zvn as represented by the following Formula (1). In the impedances Zun (=Run+j·ω·Lun), and Zvn (=Rvn+j·ω·Lvn), an angular frequency ω (ω=2πf, for example, f=40 kHz) is sufficiently large, and coil resistances Run and Rvn become sufficiently smaller than reactances (ω·Lun) and (ω·Lvn), respectively. Hence, the phase-to-phase voltage ratio Vun/Vvn becomes substantially equal to the phase-to-phase inductance ratio Lun/Lvn.

Alternatively, since the pulse width Δt is small (for example, 10 µsec), the current change rate (ΔI/Δt) is large. In addition, since the voltage drops in each of the coil resistances Run and Rvn are sufficiently smaller than the voltage drops in the inductances Lun and Lvn, the phase-to-phase voltage ratio Vun/Vvn becomes substantially equal to the phase-to-phase inductance ratio Lun/Lvn as represented by the following Formula (2).

[Formula 1]

$$\frac{Vun}{Vvn} = \frac{Zun}{Zvn} = \frac{Run + j \cdot \omega \cdot Lun}{Rvn + j \cdot \omega \cdot Lvn} \approx \frac{Lun}{Lvn} \quad (1)$$

[Formula 2]

$$\frac{Vun}{Vvn} = \frac{I \cdot Run + \frac{dI}{dt} \cdot Lun}{I \cdot Rvn + \frac{dI}{dt} \cdot Lvn} \approx \frac{Lun}{Lvn} \quad (2)$$

Figure 11:
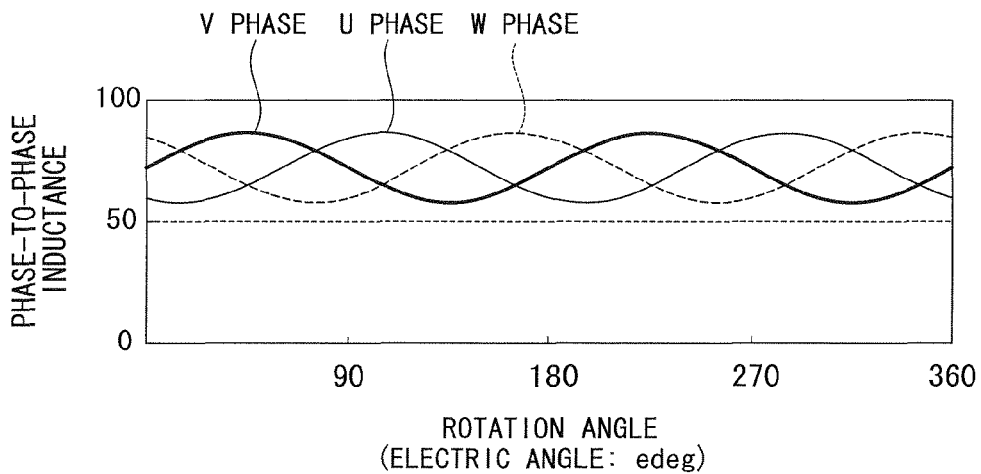
FIG. 11 is a graph illustrating a correspondence relationship between a rotation angle $\theta m$ and each of phase-to-phase inductance Lun, Lvn, and Lwn according to an embodiment of the present invention.

For example, as shown in FIG. 11, the phase-to-phase inductances Lun, Lvn, and Lwn vary in accordance with the stop-period rotation angle θs while having a phase difference of 120° in each electric angle (edeg) due to a salient pole property of the motor 31, and two cycles of the variation correspond to 360° in the electric angle (edeg).

In FIG. 11 showing the variation in inductance of the motor 31, for example, the average value of the phase-to-phase inductances Lun, Lvn, and Lwn is about 72 µH, and the phase-to-phase inductances Lun, Lvn, and Lwn vary between the minimum value (for example, 58 µH) and the maximum value (for example, 86 µH).

Accordingly, it is possible to detect the stop-period rotation angle θs from the phase-to-phase voltage ratio Vun/Vvn, which is approximately equal to the phase-to-phase inductance ratio Lun/Lvn.

For example, in respect to the coil resistance Run (for example, 10 mΩ) of the motor 31 and the angular frequency ω (for example, $2\pi \times 40 \times 10^3$ rad/sec), the coil resistance Run ($=10 \times 10^{-3} \Omega$)<<impedance ω·Lun ($=18100 \times 10^{-3} \Omega$), and thus the coil resistance Run may be disregarded as represented by the above-mentioned Formula (1).

Further, since the impedances Zun and Zvn are large relative to the voltage of the battery 71, the magnitude of the current (for example, about 0.1 A) supplied to the U-phase and V-phase stator coils 64a becomes relatively smaller. Then, at the time of estimating the rotation angle, an unnecessary torque for the motor 31 is prevented from being generated by the current of the rectangular wave applied between the phase terminals of the motor 31.

Moreover, the stop-period estimator 96a selects, as the temporary estimate value, any one of two values (for example, θ1 and θ3) of the stop-period rotation angle θs selected on the basis of the first map shown in for example FIG. 9 and the second map shown in for example FIG. 10 by use of the steering torque Tq which is output from the steering torque sensor 40.

Since the two estimate value candidates of the stop-period rotation angle θs (for example, θ1 and θ3) selected on the basis of the second map have a phase difference of 180° in the electric angle (edeg), the field directions of the rotor 63 corresponding to the values (for example, θ1 and θ3), that is, the magnetic-pole directions are opposite to each other.

Hence, when the current is supplied to the motor 31 on the basis of the two estimate value candidates (for example, θ1 and θ3) in the same manner, one is used to assist the driver's steering torque such that the assisting torque of the motor 31 is generated in the same direction as the driver's steering direction, and the other is used to increase the driver's steering torque such that the assisting torque of the motor 31 is generated in a direction opposite to the driver's steering direction. Accordingly, by observing the steering torque, it is possible to determine whether or not the estimate value candidate is appropriate.

For example, as shown in the time chart in FIG. 12 or 13, in a period (that is, a period before a time t1) during which the steering torque Tq (the torque detection signal) detected by the steering torque sensor 40 is zero, the motor 31 is in the stopped state, and the stop-period estimator 96a obtains two estimate value candidates (for example, θ1 and θ3) as the stop-period rotation angle θs on the basis of the first map and the second map. Here, the stop-period estimator 96a selects any one (for example, θ1) of the two estimate value candidates (for example, θ1 and θ3) of the stop-period rotation angle θs as the estimate value (the temporary estimate value) of the so-called temporary stop-period rotation angle θs. In the example shown in FIG. 12 or 13, the motor 31 is in the stopped state in a period during which the detected steering torque Tq (the torque detection signal) is zero. However, even in a case where the minute torque is generated, it is the same as the case where the motor 31 is in the stopped state.

For example, in the state after the time t1 as shown in FIG. 12 or 13, the steering torque (the torque detection signal) Tq, which is detected by the steering torque sensor 40, starts to increase from zero in accordance with the driver's steering input. Then, the stop-period estimator 96a allows the steering assisting force of the motor 31 to be applied in the same direction as that of the driver's steering input in accordance with the temporary estimate value of the stop-period rotation angle θs, and outputs the command signal Vsb, which instructs a predetermined minute current to be supplied temporarily (the period from the time t2 to t3) to the motor 31 through the FET bridge 72, to the PWM signal generating section 94.

In addition, the predetermined minute current is supplied in the state (for example, the period from the t1 to t4 as shown in FIG. 12 or 13) where the steering torque Tq (the torque detection signal) detected by the steering torque sensor 40 is equal to or less than a predetermined assisting lower-limit torque (the assisting dead zone).

For example, in the period from the time t2 to t3 as shown in FIG. 12 or 13, the predetermined minute current (the motor current) is supplied to the motor 31. Hence, for example, as shown in FIG. 12, when the increase rate of the steering torque (the torque detection signal) Tq detected by the steering torque sensor 40 decreases or the steering torque (the torque detection signal) Tq decreases, the steering assisting torque of the motor 31 is generated in the same direction as the driver's steering direction. Thus, the stop-period estimator 96a determines that the temporary estimate value (for example, θ1) of the stop-period rotation angle θs is appropriately set, and sets the temporary estimate value (for example, θ1) as the estimate value of the stop-period rotation angle θs in the stopped state of the motor 31 before the supply of the predetermined minute current.

Meanwhile, as shown in FIG. 13, the predetermined minute current (the motor current) is supplied to the motor 31. Hence, when the increase rate of the steering torque (the torque detection signal) Tq detected by the steering torque sensor 40 increases, the assisting torque of the motor 31 is generated in a direction different from (that is, opposite to) the driver's steering direction. In this case, it is determined that the temporary estimate value (for example, θ1) of the stop-period rotation angle θs is not appropriately set, and it is determined that a value other than this temporary estimate value (for example, θ1), that is, the other (for example, θ3) of the two values (for example, θ1 and θ3) of the stop-period rotation angle θs needs to be appropriately set as the estimate value of the stop-period rotation angle θs. For example, in the state after the time t3 as shown in FIG. 13, a flag value of a driving direction invert flag for inverting the driving direction of the motor 31 is set to "1", and the other (for example, θ3) of the two values (for example, θ1 and θ3) of the stop-period rotation angle θs is set as the estimate value of the stop-period rotation angle θs in the stopped state of the motor 31 before the supply of the predetermined minute current.

Further, for example, in the state after the time t4 as shown in FIG. 12 or 13, when the steering torque (torque detection signal) Tq exceeds the assisting lower-limit torque, the motor 31 is started by using the set stop-period rotation angle θs.

In a driving state where the rotation speed ωm of the motor 31 is not less than a predetermined speed, the U-phase-to-phase voltage Vun or the V-phase-to-phase voltage Vvn increases more than the predetermined value during the stoppage of the motor due to the induced voltage caused by the rotation of the motor 31. Therefore, it is difficult to perform the estimation due to an aberration occurring in the method of detecting the inductance changed by the rotation angle θm of the motor 31 by use of the phase-to-phase voltage ratio obtained when the AC voltage is applied between lines of the motor 31. Accordingly, in this case, the rotation-period estimator 96b of the rotation angle estimator 96 estimates that the motor 31 is rotating, and the switching section 97 selects the rotation angle estimation performed by the stop-period estimator 96a. In addition, the rotation-period estimator 96b estimates the rotation-period estimate rotation angle θr on the basis of the induced voltage which changes in accordance with the magnetic pole position of the rotor 63.

Figure 14:
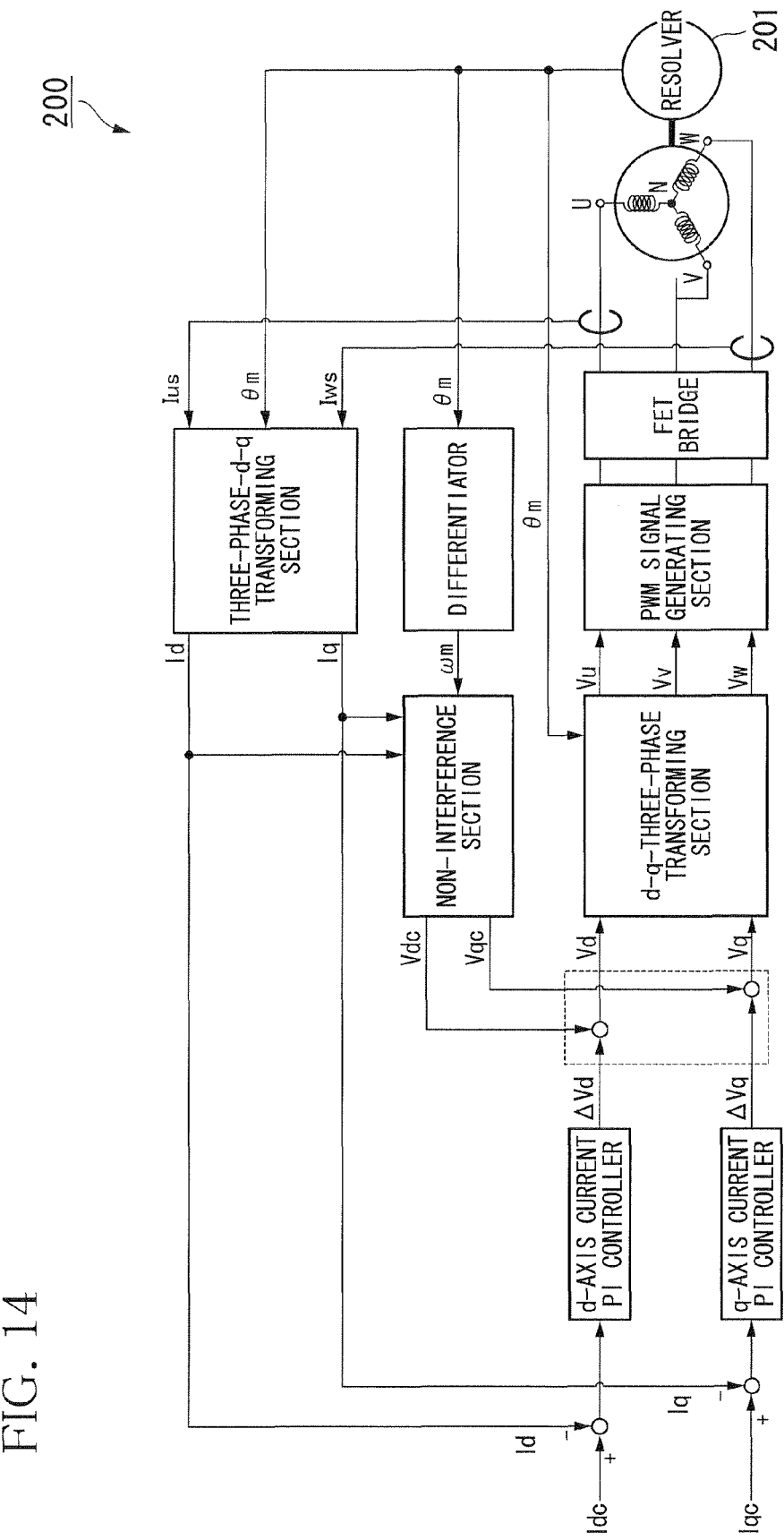
FIG. 14 is a diagram illustrating a configuration of a motor control block according to an example of the conventional technique as a comparative example relative to an embodiment of the present invention.
Figure 15:
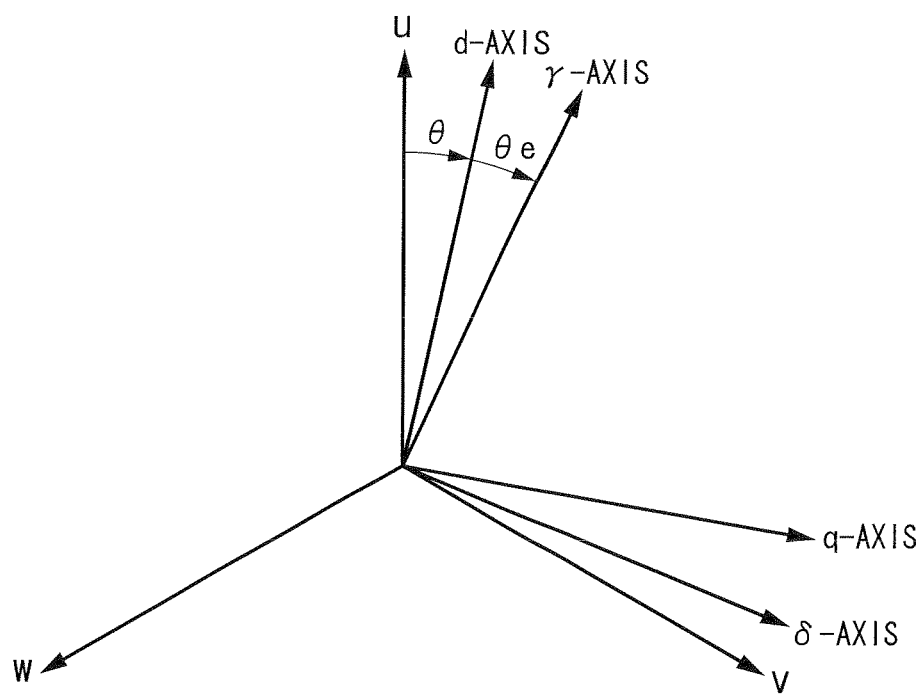
FIG. 15 is a diagram illustrating an example of a correspondence relationship between d-q axis and γ-δ axis according to an embodiment of the present invention.

The principle of the estimation is as follows. For example, in a vector control block 200 based on the conventional d-q axis using the rotation sensor (the resolver) 201 shown in FIG. 14, with respect to the d-q axis of the actual motor 31, there is set the γ-δ axis having the phase difference θe (=actual rotation angle θ-rotation-period estimate rotation angle θr) and the rotation speed ωe, for example as shown in FIG. 15 and as represented by the following Formula (3).

Figure 16:
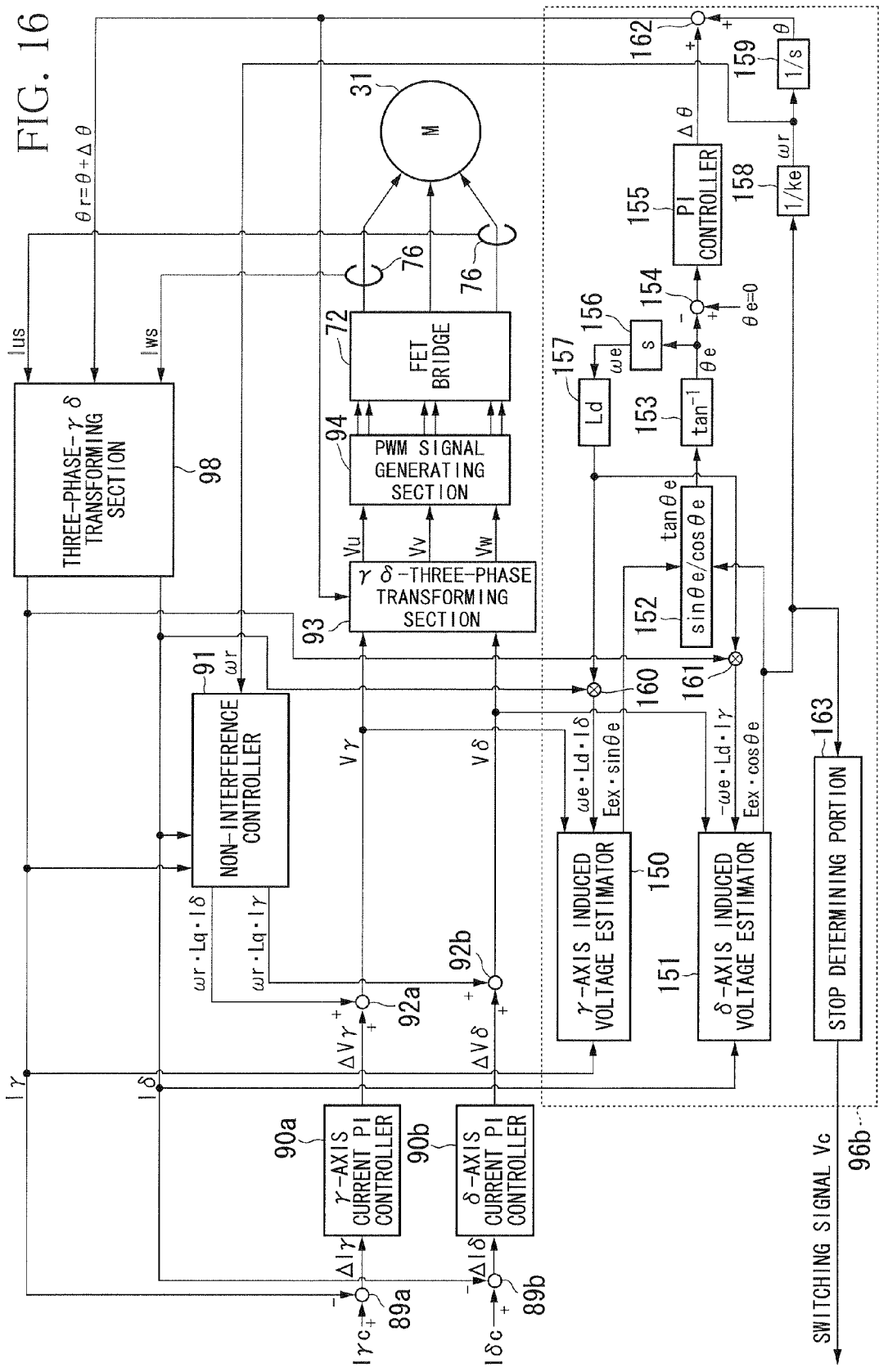
FIG. 16 is a diagram illustrating a configuration of a motor control block according to an embodiment of the present invention.

The induced voltage, which has a phase angle of the phase difference θe from the d axis and the q axis and is generated in the γ axis and the δ axis, is estimated as shown in FIG. 17, and the estimated phase difference θe is obtained from the induced voltage generated in the γ axis and the δ axis as shown in FIG. 17. Further, the control is performed so that the phase difference θe is converged to zero and the rotation-period estimate rotation angle θr is equal to the rotation angle (the actual rotation angle) θ as shown in FIG. 16.

[Formula 3]

$$\theta e = \theta - \theta r \quad (3)$$

Further, the current on the d-q axis (the d-axis current Id and the q-axis current Iq), the voltage on the d-q axis (the d-axis voltage command value Vd and the q-axis voltage command value Vq), the current on the γ-δ axis (the γ-axis current Iγ and the δ-axis current Iδ), and the voltage on the γ-δ axis (the γ-axis voltage Vγ and the δ-axis voltage Vδ) are represented by the following Formulae (4) and (5).

[Formula 4]

$$\begin{bmatrix} V\gamma \\ V\delta \end{bmatrix} = \begin{bmatrix} \cos\theta e & -\sin\theta e \\ \sin\theta e & \cos\theta e \end{bmatrix} \begin{bmatrix} Vd \\ Vq \end{bmatrix} \quad (4)$$

[Formula 5]

$$\begin{bmatrix} I\gamma \\ I\delta \end{bmatrix} = \begin{bmatrix} \cos\theta e & -\sin\theta e \\ \sin\theta e & \cos\theta e \end{bmatrix} \begin{bmatrix} Id \\ Iq \end{bmatrix} \quad (5)$$

At the time of the rotation of the motor 31, the rotation angle (the rotation-period estimate rotation angle) θr is estimated. By using the rotation-period estimate rotation angle θr, a control block for vector control of the motor 31 is shown in FIG. 16. This is a detail of the vector control section in the control unit 73 shown in FIG. 6.

The rotation-period estimator 96b includes: a γ-axis induced voltage estimator 150; a δ-axis induced voltage estimating portion 151; a tan θe computing portion 152; a θe computing portion 153; a deviation computing portion 154; a PI controller 155; a differentiator 156; a Ld multiplying portion 157; a rotation number computing portion 158; an integrator 159; multipliers 160 and 161; an adder 162; and the stop determining portion 163.

The γ-axis induced voltage estimator 150 and the δ-axis induced voltage estimating portion 151 calculate and output a γ-axis induced voltage Eex·sin θe, which is an induced voltage expressed on the γ axis, and a δ-axis induced voltage Eex·cos θe, which is an induced voltage expressed in the δ axis, as shown in the block diagram in FIG. 17 from the γ-axis current Iγ and the δ-axis current Iδ, the γ-axis voltage Vγ and the δ-axis voltage Vδ, and the value (−ωe·Ld·Iγ) and the value (ωe·Ld·Iδ).

The tan θe computing portion 152 calculates and outputs the ratio tan θe as a ratio of the obtained γ-axis induced voltage Eex·sin θe and the obtained δ-axis induced voltage Eex·cos θe.

The θe computing portion 153 calculates and outputs the phase difference θe by calculating the arctangent value tan$^{-1}$ of the value of the ratio tan θe.

The deviation computing portion 154 calculates the deviation between the phase difference θe, which is calculated in the above-mentioned manner, and the phase difference θe=0 which is the convergence target value of the phase difference θe, and performs the PI control by means of the PI control section 155 so as to make the deviation equal to zero, thereby outputting the control amount Δθ.

Further, the differentiator 156 differentiates the phase difference θe calculated in the above-mentioned manner, thereby calculating and outputting the rotation speed ωe.

Furthermore, the Ld multiplying portion 157 multiplies the d-axis inductance Ld by the rotation speed we, thereby outputting the result.

On the other hand, the rotation number computing portion 158 divides the value of the δ-axis induced voltage Eex·cos θe by the induced voltage constant ke which is stored in advance, thereby calculating and outputting the estimate rotation number ωr.

Furthermore, the integrator 159 integrates the estimate rotation number ωr on the basis of the initial rotation angle θ0 which is output from the stop-period estimator 96a, thereby calculating and outputting the rotation angle (the actual rotation angle) θ.

In addition, the multiplier 160 outputs the value (ωe·Ld·Iδ) which is obtained by multiplying the δ-axis current Iδ by the multiplied value (ωe·Ld) between the rotation speed ωe and the d-axis inductance Ld.

The multiplier 161 outputs the value (−ωe·Ld·Iγ) which is obtained by multiplying the γ-axis current Iγ by the multiplied value (ωe·Ld) between the rotation speed we and the d-axis inductance Ld.

The adder 162 adds the control amount Δθ and the rotation angle θ, thereby outputting the result as the rotation-period estimate rotation angle θr.

Thereafter, by using the rotation-period estimate rotation angle θr and the estimate rotation number ωr, the vector control of the block diagram shown in FIG. 16 is performed so that the phase difference θe is converged to zero.

In addition, the values (the δ-axis induced voltages Eex·cos θe) of FIGS. 16 and 17 represent the induced voltages Eex of the motor 31 when the phase angle θe is converged to zero. The stop determining portion 163 determines whether the motor 31 is stopping or rotating on the basis of the magnitude of the value (the δ-axis induced voltage Eex·cos θe), and outputs the switching signal Vc to the switching section 97.

Figure 25:
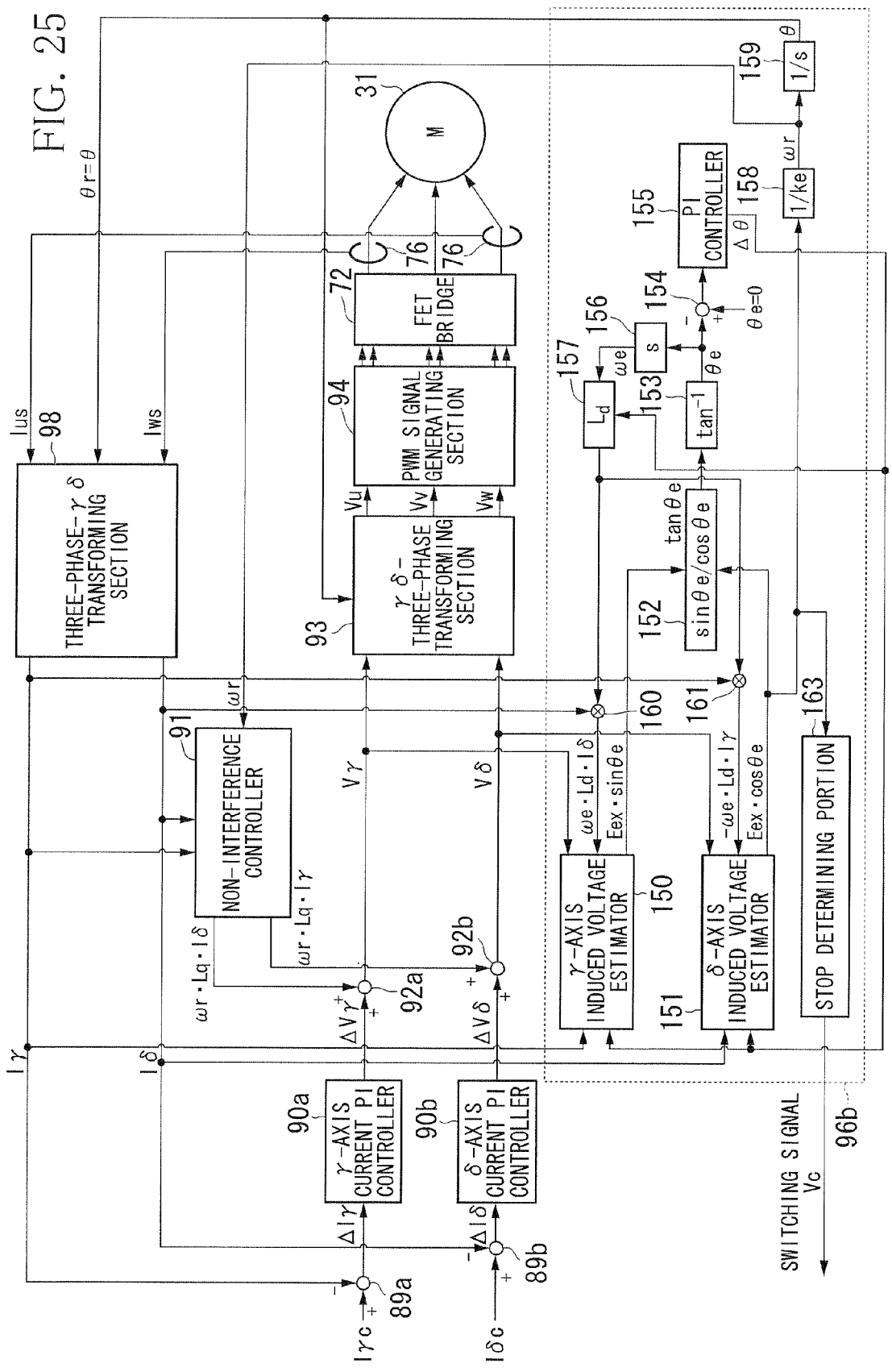
FIG. 25 is a diagram illustrating a configuration of a motor control block according to a modified example of an embodiment of the present invention.

In addition, as shown in FIGS. 16 and 17, the vector control is performed by adding the control amount Δθ to the rotation angle θ and outputting this result as the rotation-period estimate rotation angle θr, and thereby the phase angle θe is converged to zero as an example. However, the present invention is not limited to this, and for example in the form of the modified example shown in FIG. 25, the phase angle θe may be converged to zero by changing the characteristics of the γ-axis induced voltage estimator 150 and the δ-axis induced voltage estimator 151 on the basis of the control amount Δθ.

Figure 26:
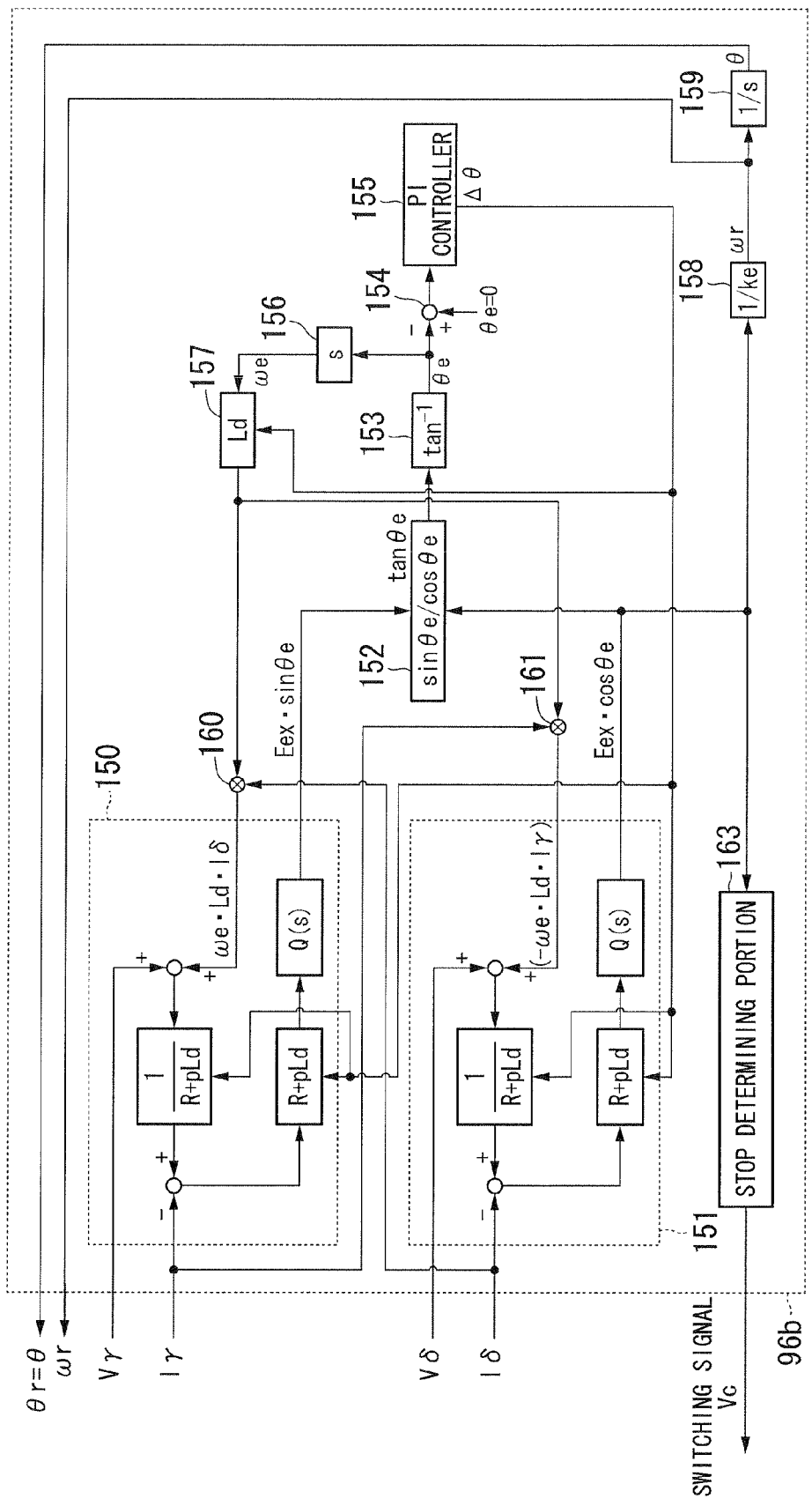
FIG. 26 is a block configuration diagram of a rotation-period estimator according to the modified example of an embodiment of the present invention.

For example, in the form of the modified example shown in FIG. 26, one or both of the resistance value R (the motor resistance R) and the d-axis inductance Ld in the γ-axis induced voltage estimator 150 and the δ-axis induced voltage estimating portion 151 are changed on the basis of the control amount Δθ. Specifically, the map of the resistance value R and the d-axis inductance Ld relative to the control amount Δθ is provided in advance, and by searching the map, the resistance value R and the d-axis inductance Ld are changed.

In a state where the exciting voltage of which the voltage amplitude is formed as a sine wave is applied to the exciting coil 36a of the resolver 34, the RD converter 99 detects, in accordance with the rotation (that is, the rotation of the rotary shaft 65 of the motor 31) of the resolver rotor 35, the cosine wave output voltage and the sine wave output voltage, which are envelopes of the voltage amplitudes induced in the first and second output coils 36b and 36c in accordance with the rotation angle θm of the motor 31, through the RD conversion process. Moreover, the RD converter 99 calculates the ratio tan θm which is the ratio of the sine wave output voltage and the cosine wave output voltage, and calculates the rotation angle θm from the arctangent value $\tan^{-1}$ of the value of the ratio tan θm.

The abnormal condition detecting section 100 determines whether or not an abnormal condition occurs in the resolver 34 on the basis of the cosine wave output voltage and the sine wave output voltage which are output from the RD converter 99. Then, if it is determined that the resolver 34 is abnormal, an abnormal condition detection signal is output.

The first method as a method of detecting an abnormal condition of the resolver 34 uses the fact that the sum of the squares of each of the sine wave output voltage and the cosine wave output voltage for example shown in FIG. 5B is normally a predetermined constant value (that is, $\sin^2 \theta m + \cos^2 \theta m = $ constant). Therefore, if the sum of the squares is out of the predetermined range, it is determined that an abnormal condition has occurred.

Further, the second method as a method of detecting the abnormal condition of the resolver 34 uses the fact that each of the sine wave output voltage and the cosine wave output voltage for example shown in FIG. 5B normally varies in the regular predetermined range. Therefore, if the values of the sine wave output voltage and cosine wave output voltage are out of the predetermined range, it is determined that an abnormal condition has occurred.

The abnormal condition detecting section 100 determines whether or not an abnormal condition has occurred in the resolver 34 by a use of any one of the first and second methods or by combined use of the first and second methods.

The rotation signal switching control section 101 outputs the estimation instruction signal, the switching instruction signal, the PWM drive permission signal, the current-limit signal, and the gradual change instruction signal, in accordance with the abnormal condition detection signal which is output from the abnormal condition detecting section 100, the torque detection signal Tq which is output from the steering torque sensor 40, and the vehicle speed V which is output from the vehicle speed sensor 78.

The estimation instruction signal instructs the rotation angle estimator 96 to estimate the rotation angles θs and θr at the time of the stoppage and the rotation of the motor 31 when the abnormal condition detecting section 100 determines that an abnormal condition has occurred in the resolver 34.

The switching instruction signal is a command signal for controlling the switching operation of the rotation signal switch 102. The rotation signal switch 102 selects any one of the rotation angle θm and the estimate rotation number ωr, which are output from the switching section 97, or the rotation angle θm and the detection rotation number ωd, which are output from the RD converter 99, in accordance with the switching instruction signal, and outputs the selected one as the rotation angle θm and the rotation speed ωm.

If the abnormal condition detection signal is not output from the abnormal condition detecting section 100, that is, if it is determined that an abnormal condition has not occurred in the resolver 34, the switching instruction signal instructs selection of the rotation angle θm and the detection rotation number ωd which are output from the RD converter 99. In contrast, if the abnormal condition detection signal is output from the abnormal condition detecting section 100, that is, if it is determined that an abnormal condition has occurred in the resolver 34, the switching instruction signal instructs selection of the rotation angle θm and the estimate rotation number ωr which are output from the switching section 97.

Figure 18A:
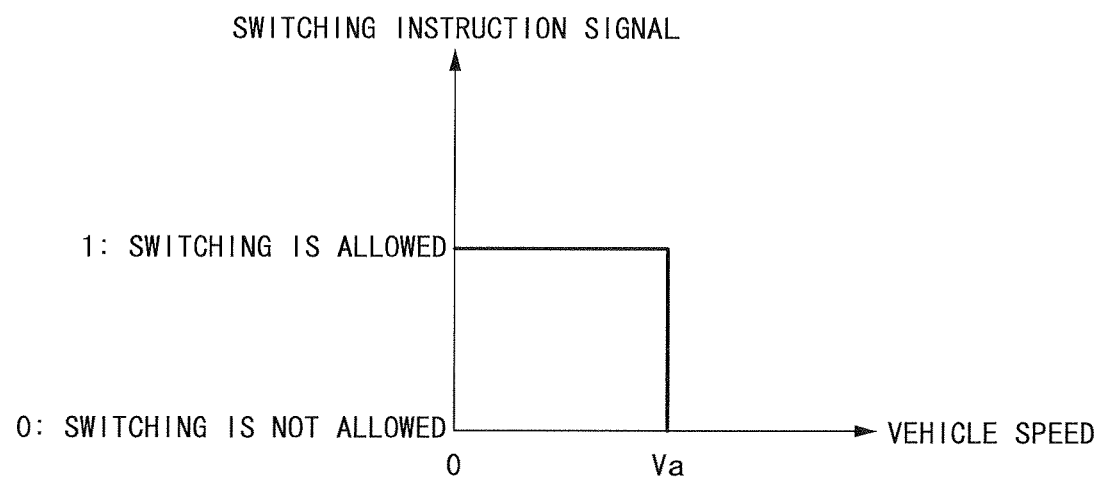
FIG. 18A is a diagram illustrating an example of a correspondence relationship between a switching instruction signal and a vehicle speed according to an embodiment of the present invention.
Figure 18B:
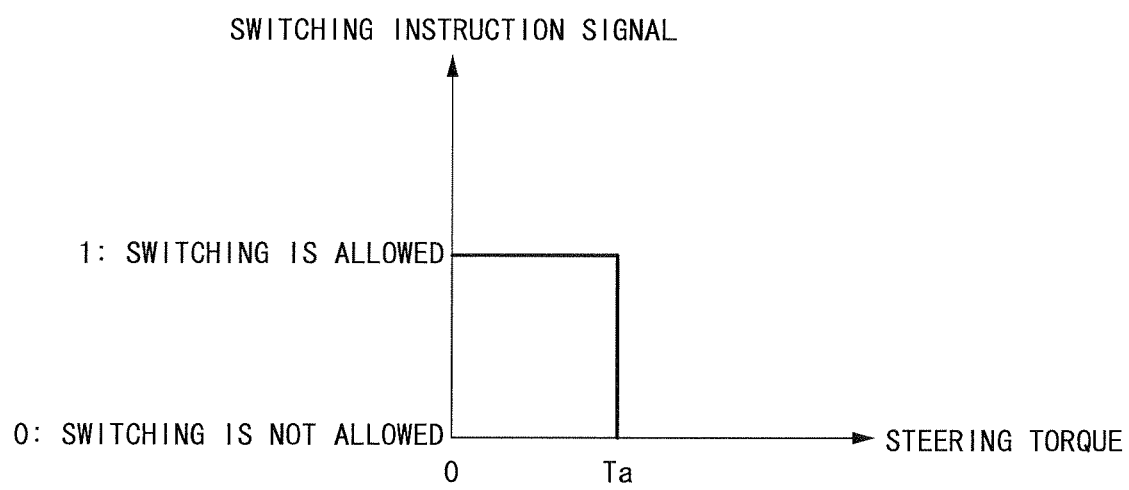
FIG. 18B is a diagram illustrating an example of a correspondence relationship between a switching instruction signal and a steering torque according to an embodiment of the present invention.

The timing at which the switching instruction signal is output (that is, the timing at which "1" representing switching permission is output as a switching instruction signal) is a timing at which output variation of the motor 31 does not excessively increase before or after the switching or a timing at which the driving motion of the vehicle is not unstable before or after the switching. For example, as shown in FIGS. 18A and 18B, the timing corresponds to the case where the torque detection signal Tq which is output from the steering torque sensor 40 is less than the predetermined steering torque Ta or the case where the vehicle speed V which is output from the vehicle speed sensor 78 is less than the predetermined vehicle speed Va.

The PWM drive permission signal is a signal for allowing the FET bridge 72 to supply a current to the motor 31, that is, a signal for allowing the FET bridge 72 to perform the PWM driving of the motor 31. The output of the PWM drive permission signal is temporarily stopped by the fail-safe process at the time point at which the abnormal condition detection signal representing the occurrence of an abnormal condition in the resolver 34 starts to be output from the abnormal condition detecting section 100, otherwise (that is, in a normal state) the PWM drive permission signal is continuously output.

In the state where the PWM drive permission signal is output to the PWM signal generating section 94, the PWM signal is output from the PWM signal generating section 94 to the FET bridge 72, and thus the PWM driving of the motor 31 is performed. In contrast, in the state where the PWM drive permission signal is not output to the PWM signal generating section 94, the PWM signal is not output from the PWM signal generating section 94 to the FET bridge 72, and thus the PWM driving of the motor 31 is stopped.

At the time point at which the abnormal condition detection signal representing the occurrence of an abnormal condition in the resolver 34 starts to be output from the abnormal condition detecting section 100, the current-limit signal instructs the current-limit control section 103 to make zero the value of the δ-axis target current Iδc which is output from the current-limit control section 103 to the current deviation calculating section 89 through the fail-safe process.

When the selection operation in the rotation signal switch 102 is switched by the switching instruction signal, in order to prevent the driving amount of the motor 31 from rapidly varying before and after the switching, the gradual change instruction signal instructs the current-limit control section 103 to gradually increase the δ-axis target current Iδc, which is output from the current-limit control section 103 to the current deviation calculating section 89 after the switching, from zero to the value of the δ-axis target current Iδc which is output from the second correction computing section 86.

By means of the above, when the abnormal condition detection signal representing the occurrence of an abnormal condition of the resolver 34 is output from the abnormal condition detecting section 100, the current-limit signal is output from the rotation signal switching control section 101 to the current-limit control section 103. Then, the value of the δ-axis target current Iδc, which is output from the current-limit control section 103 to the current deviation calculating section 89, is set to zero. In addition, the output of the PWM drive permission signal from the rotation signal switching control section 101 to the PWM signal generating section 94 is temporarily stopped, and thus the driving control of the motor 31 is temporarily stopped. As a result, the motor 31 is in the stopped state in which the assist torque is not output.

Then, the estimation instruction signal is output from the rotation signal switching control section 101 to the rotation angle estimator 96, thereby starting to estimate the stop-period rotation angle θs at the time of the stoppage of the motor 31 and the rotation-period estimate rotation angle θr at the time of the rotation thereof. Then, when the predetermined condition (for example, the torque detection signal Tq is less than the predetermined steering torque Ta, or the vehicle speed V is less than the predetermined vehicle speed Va) is satisfied, the switching instruction signal is output from the rotation signal switching control section 101 to the rotation signal switch 102. In accordance with the switching instruction signal, instead of the rotation angle θm and the detection rotation number ωd which are output from the RD converter 99, the rotation angle θm and the estimate rotation number ωr which are output from the switching section 97 are switched to be selected as the rotation angle θm and the rotation speed corn which are output to the outside.

Then, in accordance with the rotation angle θm and the rotation speed corn, the feedback control (the vector control) of current is started on the γ-δ coordinate, thereby restarting the output of the PWM drive permission signal from the rotation signal switching control section 101 to the PWM signal generating section 94. Then, the gradual change instruction signal is output from the rotation signal switching control section 101 to the current-limit control section 103. Thus, the value of the δ-axis target current Iδc, which is output from the current-limit control section 103 to the current deviation calculating section 89, gradually increases from zero to the value of the δ-axis target current Iδc which is output from the second correction computing section 86.

The electric steering system 1 according to the embodiment has the above-mentioned configuration. Thus, next, an operation of the electric steering system 1 will be described. Particularly, a process in the case of detecting an abnormal condition of the resolver 34 at the time of the driving control of the motor 31 will be described.

Figure 19:
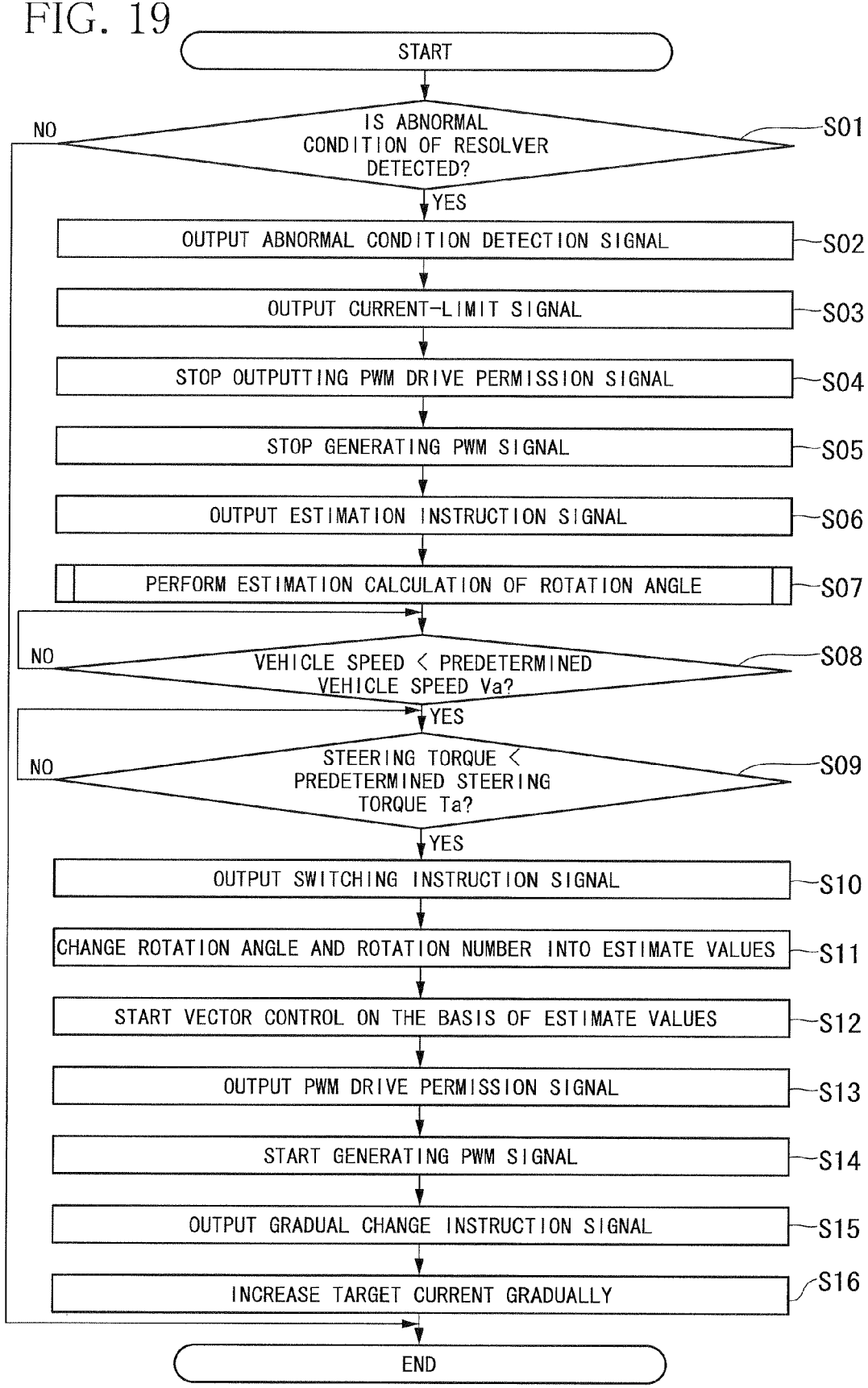
FIG. 19 is a flowchart illustrating an operation of the electric steering system according to an embodiment of the present invention, in particular, a process in a case where abnormal condition of the resolver is detected at the time of the driving control of the motor.

First, for example, in step S01 shown in FIG. 19, it is determined whether or not an abnormal condition of the resolver 34 is detected.

If the determination result is "NO", the process does not advance.

In contrast, if the determination result is "YES", the process advances to step S02.

Then, in step S02, the abnormal condition detection signal representing the occurrence of an abnormal condition of the resolver 34 is output.

Subsequently, in step S03, the current-limit signal is output for instructing to make zero the value of the δ-axis target current Iδc, which is output from the current-limit control section 103 to the current deviation calculating section 89.

Then, in step S04, the output of the PWM drive permission signal is stopped.

Subsequently, in step S05, the PWM signal generating section 94 stops generating the PWM signal.

Then, in step S06, the estimation instruction signal is output.

Subsequently, in step S07, the process of the estimation calculation of the rotation angle is started.

Then, in step S08, it is determined whether or not the vehicle speed V which is output from the vehicle speed sensor 78 is less than the predetermined vehicle speed Va.

If the determination result is "NO", the determination process in step S08 is repeated.

In contrast, if the determination result is "YES", the process advances to step S09.

Then, in step S09, it is determined whether or not the torque detection signal Tq which is output from the steering torque sensor 40 is less than the predetermined steering torque Ta.

If the determination result is "NO", the determination process in step S09 is repeated.

In contrast, if the determination result is "YES", the process advances to step S10.

Subsequently, in step S10, the switching instruction signal is output.

Then, in step S11, instead of the rotation angle θm and the detection rotation number ωd which are output from the RD converter 99, the rotation angle θm and the estimate rotation number ωr (that is, the estimate values of the rotation angle and the rotation number) which are output from the switching section 97 are switched to be selected as the rotation angle θm and the rotation speed ωm which are output from the rotation signal switch 102 to the outside.

Then, in step S12, in accordance with the rotation angle θm and the rotation speed ωm in which the estimate values of the rotation angle and the rotation number are set, the feedback control (the vector control) of current is started on the γ-δ coordinate.

Subsequently, in step S13, the output of the PWM drive permission signal is restarted.

Then, in step S14, the PWM signal generating section 94 starts to generate the PWM signal.

Subsequently, in step S15, the gradual change instruction signal is output.

Then, in step S16, the value of the δ-axis target current Iδc, which is output from the current-limit control section 103 to the current deviation calculating section 89, is changed to gradually increase from zero to the value of the δ-axis target current Iδc which is output from the second correction computing section 86, and the process advances to the END, and then the series of processes ends.

Hereinafter, the process of the estimation calculation of the rotation angle in step S07 mentioned above will be described.

Figure 20:
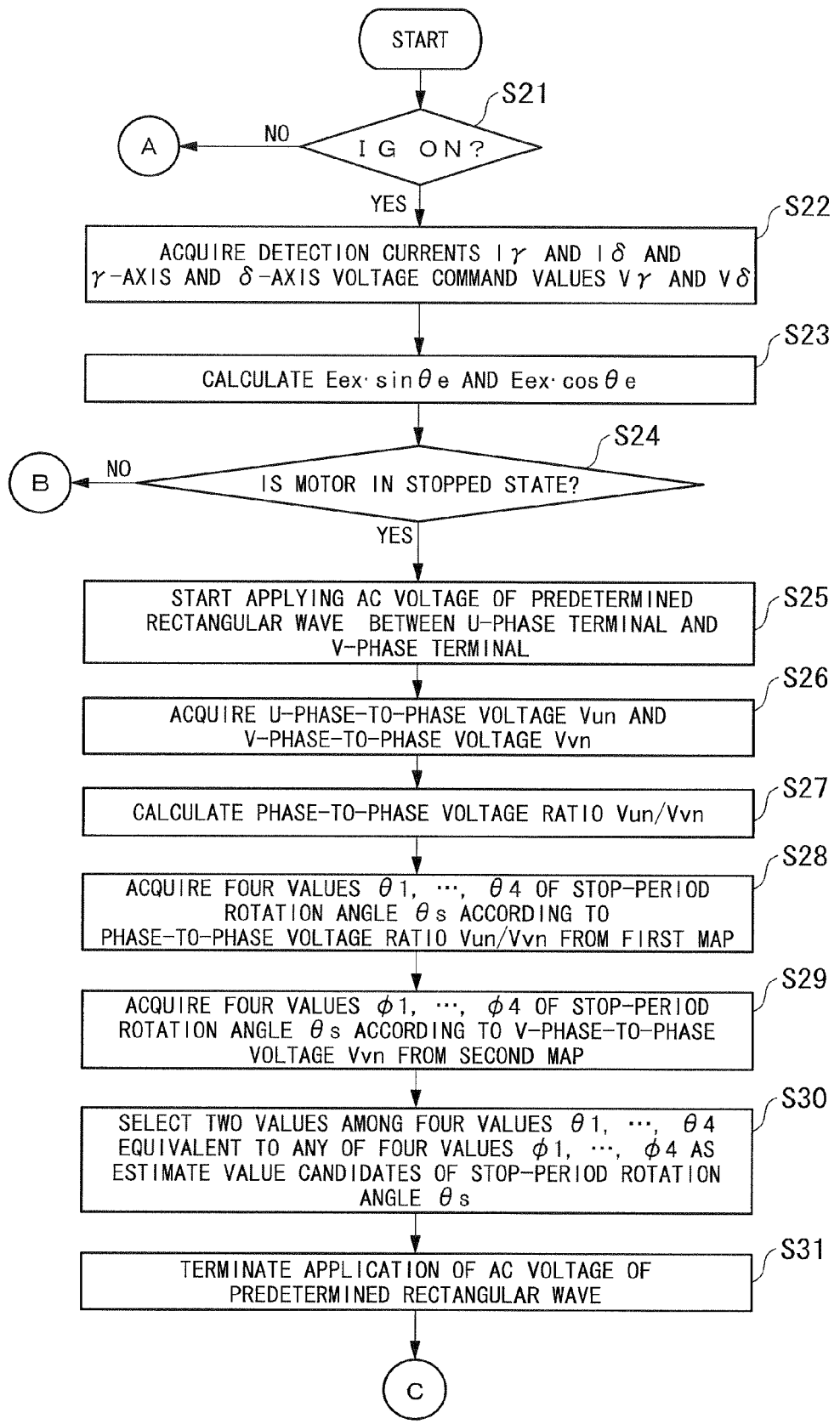
FIG. 20 is a flowchart illustrating an operation of the electric steering system according to an embodiment of the present invention, in particular, operations of a rotation angle estimator and a switching section.

First, for example, in step S21 shown in FIG. 20, it is determined whether or not an ignition switch of the vehicle is turned on (IG ON).

If the determination result is "YES", the process advances to step S22.

In contrast, if the determination result is "NO", the process does not advance.

Then, in step S22, the respective detection currents (that is, the γ-axis current Iγ and the δ-axis current Iδ), and the respective voltage command values (that is, the γ-axis voltage Vγ and the δ-axis voltage Vδ) are acquired.

Subsequently, in step S23, the γ-axis induced voltage Eex·sin θe and the δ-axis induced voltage Eex·cos θe are calculated from the acquired γ-axis current Iγ, the acquired δ-axis current Iδ, the acquired γ-axis voltage Vγ, and the acquired δ-axis voltage Vδ.

Then, in step S24, on the basis of the value of the δ-axis induced voltage Eex·cos θe, it is determined whether or not the motor 31 is in the stopped state.

For example, as described above, when the value (Eex·cos θe) is smaller than the predetermined value, the induced voltage is not generated by the rotation of the motor 31, and thus it is determined that the motor 31 is stopped.

If the determination result is "NO", the process advances to step S44 to be described later.

In contrast, if the determination result is "YES", the process advances to step S25.

Then, in step S25, the AC voltage of the predetermined rectangular wave starts to be applied between the phase terminals (for example, between the U-phase terminal and the V-phase terminal and the like) of the motor 31, and the process of estimating the stop-period rotation angle θs is started.

Subsequently, in step S26, the U-phase-to-phase voltage Vun (=Vu−Vn) and the V-phase-to-phase voltage Vvn (=Vv−Vn) are acquired on the basis of the middle-point voltage Vn and the phase voltages Vu and Vv detected by the voltage sensors 77.

Then, in step S27, the phase-to-phase voltage ratio Vun/Vvn is calculated.

Subsequently, in step S28, by searching the first map based on the phase-to-phase voltage ratio Vun/Vvn, the four values θ1, . . . , θ4 of the stop-period rotation angle θs are acquired.

Then, in step S29, by searching the second map based on the V-phase-to-phase voltage Vvn, the four values φ1, . . . , φ4 of the stop-period rotation angle θs are acquired.

Subsequently, in step S30, from the four values θ1, . . . , θ4, two values equivalent to any of the four values φ1, . . . , φ4 are selected as estimate value candidates.

Then, in step S31, the application of the AC voltage of the predetermined rectangular wave ends.

Figure 21:
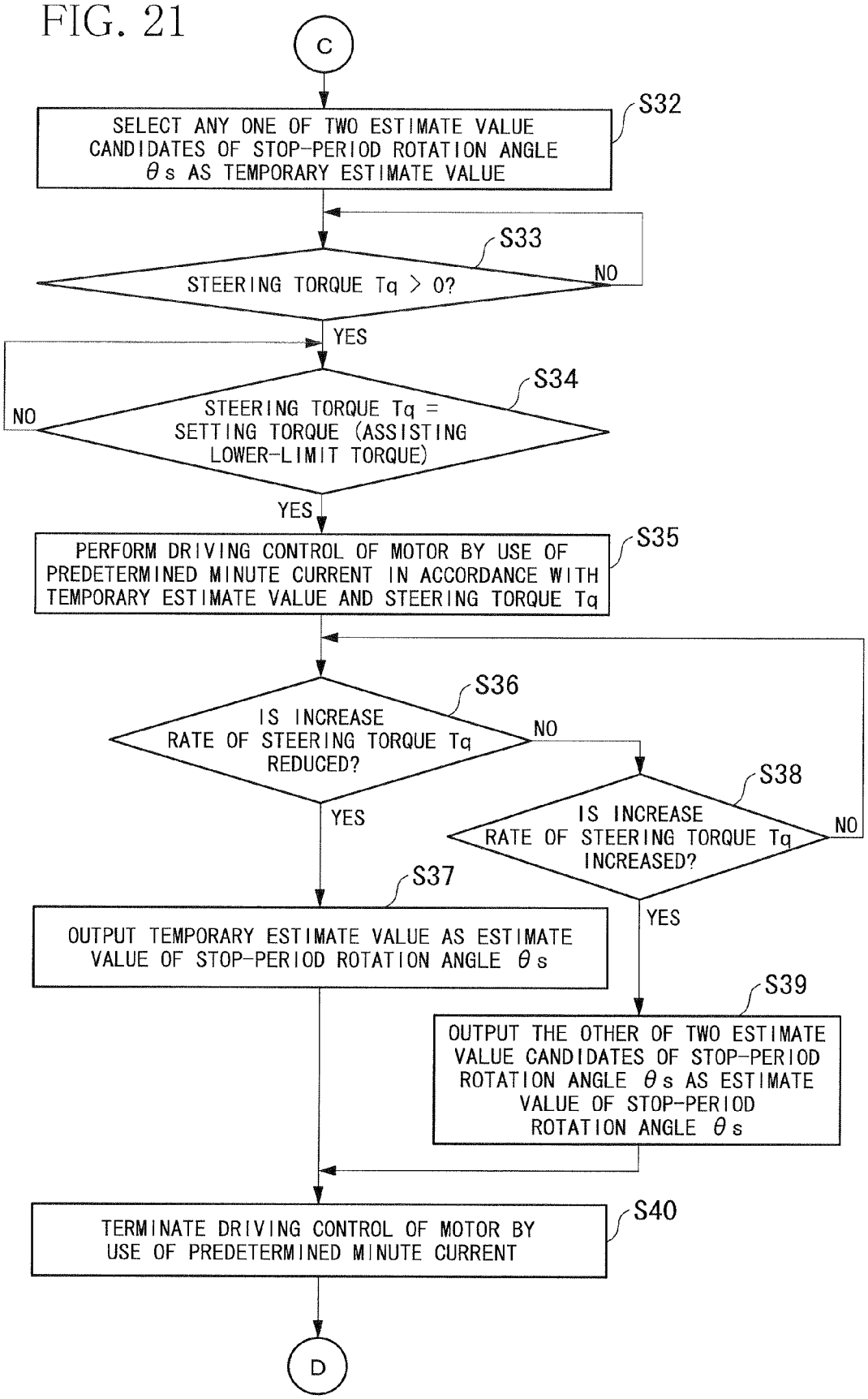
FIG. 21 is a flowchart illustrating an operation of the electric steering system according to an embodiment of the present invention, in particular, operations of a rotation angle estimator and a switching section.

Subsequently, in step S32 shown in FIG. 21, any one of the two estimate value candidates of the stop-period rotation angle θs is selected as a temporary estimate value.

Then, in step S33, it is determined whether or not the steering torque Tq which is detected by the steering torque sensor 40 is larger than zero.

If the determination result is "NO", the determination process in step S33 is repeated.

In contrast, if the determination result is "YES", that is, if the driver's steering input is started, the process advances to step S34.

Then, in step S34, it is determined whether or not the steering torque Tq is a predetermined setting torque smaller than the assisting lower-limit torque (Tq<assisting lower-limit torque).

If the determination result is "YES", the process advances to step S35.

In contrast, if the determination result is "NO", the determination process in step S34 is repeated.

Subsequently, in step S35, the motor 31 is controlled to be driven by a predetermined minute current through the FET bridge 72 so that the steering assisting force of the motor 31 is made to be applied in the same direction as the driver's steering direction in accordance with the temporary estimate values of the stop-period rotation angle θs and the steering torque Tq which are detected by the steering torque sensor 40.

Then, in step S36, it is determined whether or not the increase rate of the steering torque Tq detected by the steering torque sensor 40 decreases due to the supply of the predetermined minute current to the motor 31.

If the determination result is "NO", the process advances to step S38 to be described later.

In contrast, if the determination result is "YES", it is determined that the temporary estimate value of the stop-period rotation angle θs is appropriately set, and the process advances to step S37. In step S37, the temporary estimate value of the stop-period rotation angle θs is set as the estimate value of the stop-period rotation angle θs of the motor 31 in the stopped state before the supply of the predetermined minute current, and the process advances to step S40 to be described later.

Further, in step S38, it is determined whether or not the increase rate of the steering torque Tq detected by the steering torque sensor 40 increases due to the supply of the predetermined minute current to the motor 31.

If the determination result is "NO", the process returns to step S36 mentioned above.

In contrast, if the determination result is "YES", it is determined that the temporary estimate value of the stop-period rotation angle θs is not appropriately set, and the process advances to step S39. In step S39, the other of the two estimate value candidates is set as the estimate value of the stop-period rotation angle θs of the motor 31 in the stopped state before the supply of the predetermined minute current. This corresponds to the above-mentioned driving direction invert flag.

Then, in step S40, the driving control of the motor 31 using the predetermined minute current is terminated, the estimate value of the stop-period rotation angle θs is set as the rotation angle θm, and the estimation process of the stop-period rotation angle θs ends.

Figure 22:
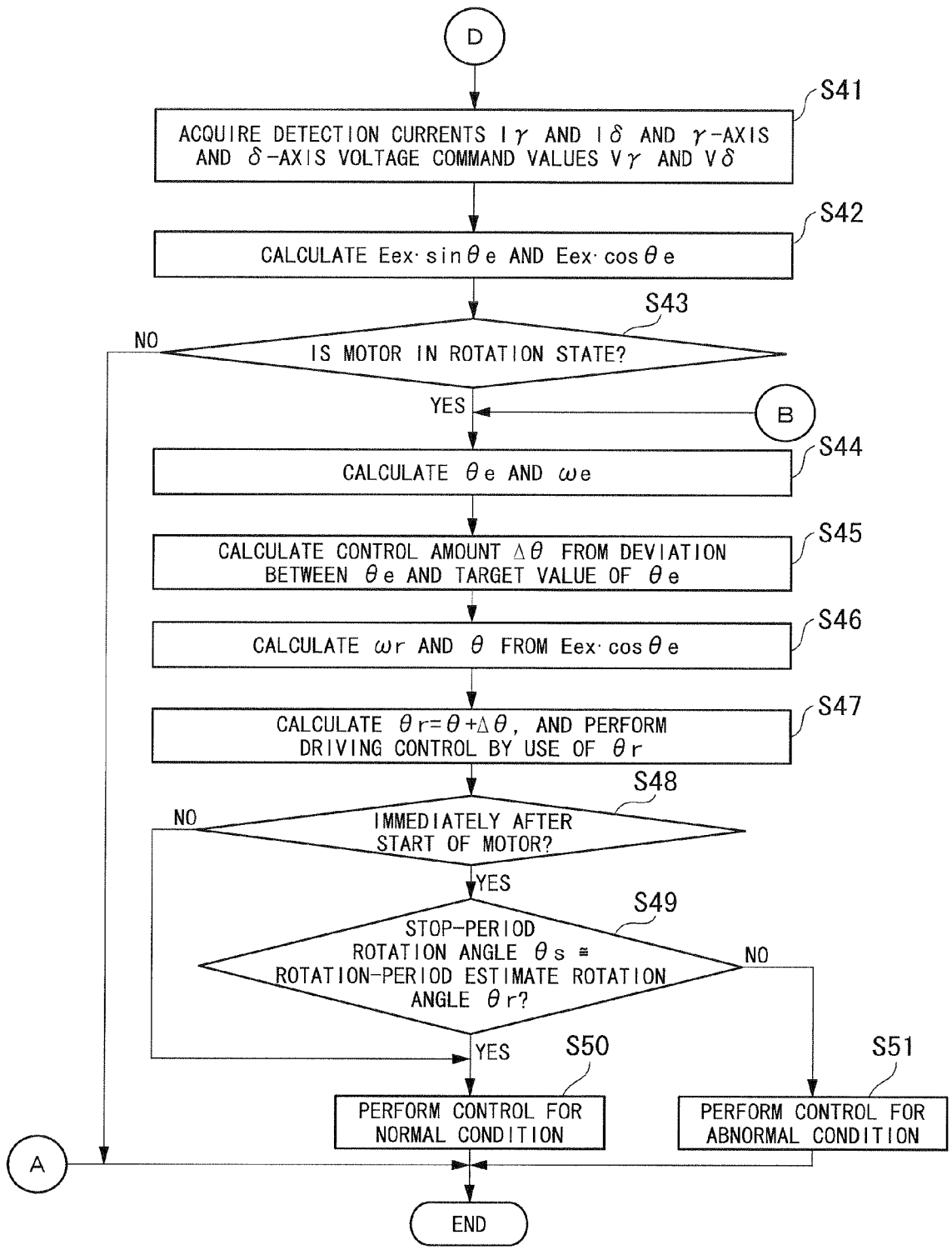
FIG. 22 is a flowchart illustrating an operation of the electric steering system according to an embodiment of the present invention, in particular, operations of a rotation angle estimator and a switching section.

Then, in step S41 shown in FIG. 22, the respective detection currents (that is, the γ-axis current Iγ and the δ-axis current Iδ), and the respective voltage command values (that is, the γ-axis voltage Vγ and the δ-axis voltage Vδ) are acquired again.

Subsequently, in step S42, the γ-axis induced voltage Eex·sin θe and the δ-axis induced voltage Eex·cos θe are calculated from the acquired γ-axis current Iγ, the acquired δ-axis current Iδ, the acquired γ-axis voltage Vγ, the acquired δ-axis voltage Vδ, the given motor resistance R and d-axis inductance Ld, and the phase difference speed (the rotation speed) we to be described later.

Then, in step S43, on the basis of the value of the δ-axis induced voltage Eex·cos θe, it is determined whether or not the motor 31 is in the rotation state.

If the determination result is "NO", the process advances to the END, and then the series of processes ends.

In contrast, if the determination result is "YES", the process advances to step S44.

Then, in step S44, the ratio (tan θe) of the obtained γ-axis induced voltage Eex·sin θe and the obtained δ-axis induced voltage Eex·cos θe is calculated, the phase difference θe is calculated by calculating the arctangent value $\tan^{-1}$ of the value of the resultant ratio (tan θe), and the phase difference speed (the rotation speed) ωe is calculated by differentiating the phase difference θe.

Subsequently, in step S45, the deviation between the phase difference θe and zero which is the convergence target value of the phase difference θe is calculated, and the control amount Δθ is calculated through the PI controller 155.

Then, in step S46, the δ-axis induced voltage Eex·cos θe is divided by the given induced voltage constant ke, thereby calculating the estimate rotation number ωr. In addition, the estimate rotation number ωr is integrated, thereby calculating the rotation angle (the actual rotation angle) θ.

In step S47, the above-mentioned rotation angle θ and control amount Δθ are added, thereby calculating the rotation-period estimate rotation angle θr. By using the rotation-period estimate rotation angle θr, the motor driving control is performed so that the phase difference θe is equal to zero.

Then, in step S48, it is determined whether or not it is immediately after the start of the motor 31.

If the determination result is "NO", the process advances to step S50 to be described later.

In contrast, if the determination result is "YES", the process advances to step S49.

Subsequently, in step S49, it is determined whether or not the difference between the stop-period rotation angle θs and the rotation-period estimate rotation angle θr is larger than the predetermined value, thereby determining whether or not the stop-period rotation angle θs and the rotation-period estimate rotation angle θr are approximately equal to each other.

If the determination result is "YES", the process advances to step S50. In step S50, as a control for normal condition, the driving control of the motor 31 based on the rotation-period estimate rotation angle θr is performed, and the series of processes ends.

In contrast, if the determination result is "NO", the process advances to step S51. In step S51, under a predetermined control for an abnormal condition, for example, the stoppage of the rotation driving of the motor 31 is instructed, or for example, the estimate value of the rotation-period estimate rotation angle θr is prevented from being output as the rotation angle θm. Moreover, in step S51, regardless of the detection signal (for example, the U-phase detection current Ius, the W-phase detection current Iws, or the like) which is output from the current sensor 76, on the basis of the detection signal which is output from the voltage sensor 77, the execution of the other known estimation process for estimating the rotation angle θm is instructed, and the series of processes ends.

In the control loop for performing the vector control of the motor 31, the rotation angle θm of the motor 31 is estimated by repeating the series of processes of steps S21 to S51, and the motor 31 is controlled.

As described above, according to the motor control device 70 of the embodiment, it is possible to perform appropriate driving control while promptly and accurately estimating the rotation angle θm even when an abnormal condition occurs in the resolver 34 for directly detecting the rotation angle θm of the motor 31. Accordingly, for example, it is possible to prevent trouble such as torque variation caused by loss of synchronism of the motor 31 and stoppage caused by loss of synchronism of the motor 31.

Further, at the time of switching the control process, by gradually increasing the control amount (for example, the value of the δ-axis target current Iδc which is output from the current-limit control section 103 to the current deviation calculating section 89) of the driving control of the motor 31 based on the estimated rotation angle θm, it is possible to prevent the output of the motor 31 from rapidly varying, and thus it is possible to smoothly control the driving of the motor 31.

In addition, according to the electric steering system 1 of the embodiment, even when an abnormal condition occurs in the resolver 34 for directly detecting the rotation angle θm of the motor 31, it is possible to perform appropriate driving control while promptly and accurately estimating the rotation angle θm. For example, it is possible to prevent trouble such as torque variation caused by loss of synchronism of the motor 31 and stoppage caused by loss of synchronism of the motor 31. Thus, it is possible to prevent the steering feeling from deteriorating, and it is possible to stabilize the driving motion of the vehicle.

Further, when the switching instruction signal is output, it is possible for the control process to switch from the driving control of the motor 31 based on the detection signal of the resolver 34 to the driving control of the motor 31 based on the estimated rotation angle θm. This timing corresponds to a low speed driving state where the yaw rate gain is relatively low and the effect of the steering on the vehicle motion is reduced but the road surface load is relatively large and thus large assist torque is necessary. Alternatively, this timing is when the driver's steering torque is relatively small. Accordingly, by preventing the steering torque from excessively varying, it is possible to appropriately reduce the steering load of a driver while preventing a driver from feeling uncomfortable when steering and preventing the vehicle motion from becoming unstable.

In addition, in the above-mentioned embodiment, the timing, at which the switching instruction signal is output, corresponds to the case where the torque detection signal Tq which is output from the steering torque sensor 40 is less than the predetermined steering torque Ta or the case where the vehicle speed V which is output from the vehicle speed sensor 78 is less than the predetermined vehicle speed Va. However, the present invention is not limited to this, and the timing may correspond to, for example, a case where the target amount (for example, δ-axis target current Iδc or the like) of the driving control of the motor 31 is less than a predetermined value.

Figure 23:
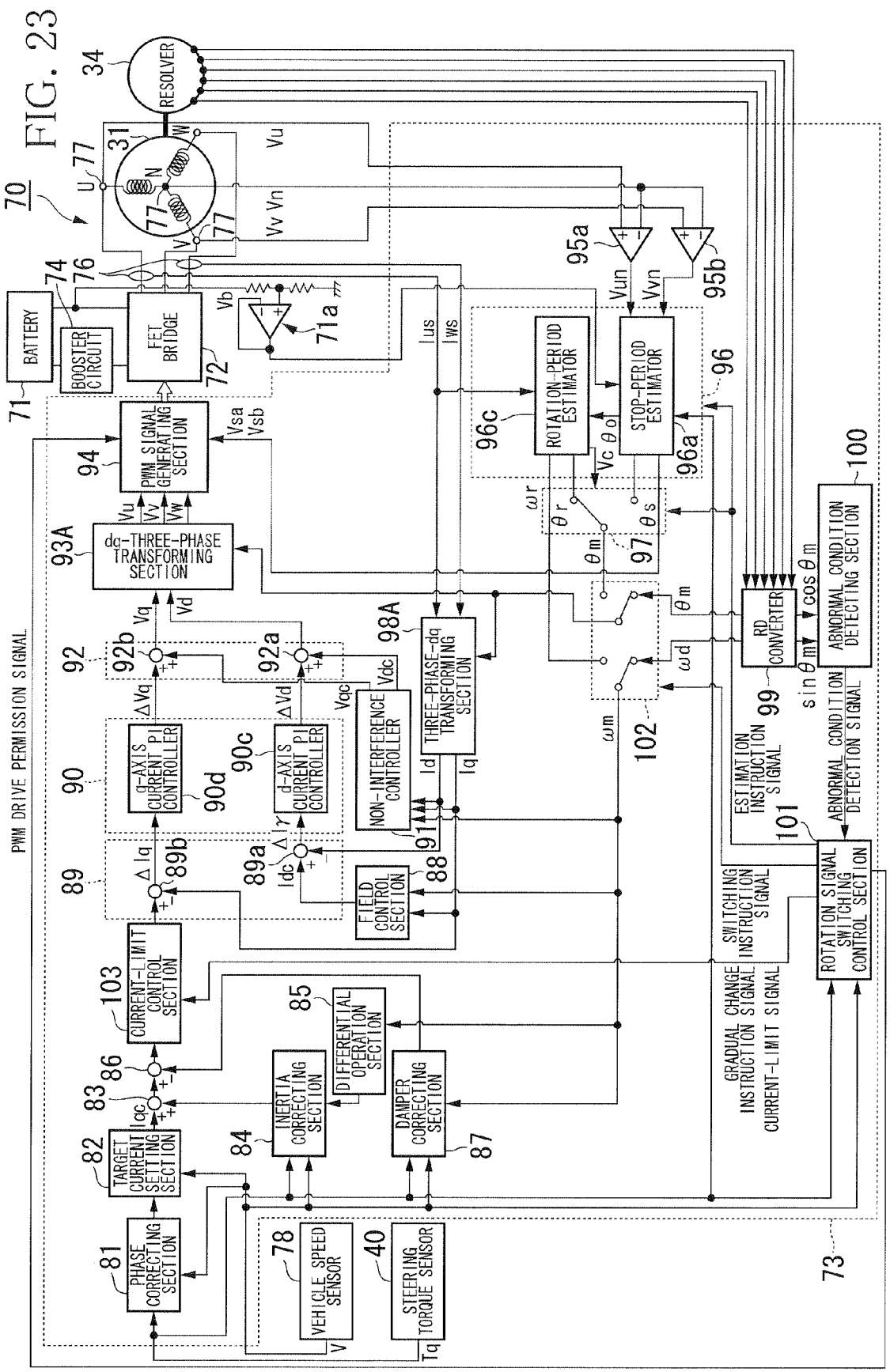
FIG. 23 is a configuration diagram of a motor control device according to a first modified example of an embodiment of the present invention.

In addition, in the above-mentioned embodiment, the rotation-period estimator 96b calculates the phase difference θe on the basis of the γ-axis current Iγ, the δ-axis current Iδ, the γ-axis voltage command value Vγ, the δ-axis voltage command value Vδ, the given motor resistance R, the given d-axis inductance Ld, and the given q-axis inductance Lq. Then, the estimator performs convergence control so as to make the phase difference θe equal to zero, thereby estimating the rotation-period estimate rotation angle θr. However, the present invention is not limited to this. For example, similarly to the motor control device 70 of the electric steering system 1 according to a first modified example shown in FIG. 23, on the basis of the U-N phase line-to-line voltage Vun (=Vu−Vn) which is calculated by the first phase-to-phase voltage calculating section 95a having the operational amplifier, the U-phase detection current Ius which is output from the current sensor 76, the given U-N phase inductance Lun, and the given resistance Run, the induced voltage Ve is calculated by the following Formula (6). Then, by using the fact that the induced voltage Ve is proportional to the rotation speed of the motor 31, the value, which is obtained by estimating the rotation speed ωr from the induced voltage Ve and differentiating the estimated result, may be set as the estimate value of the rotation-period estimate rotation angle θr. Then, by using the estimated rotation-period estimate rotation angle θr, as shown in FIG. 23, the control is performed on the d-q axis.

[Formula 6]

$$Ve = Vuv - Luv\frac{dIus}{dt} - RunIus \tag{6}$$

In the first modified example, the principal point different from the above-mentioned embodiment is that the target current setting section 82 outputs the q-axis target current Iqc. In addition, the current control section 90 includes: a d-axis current PI controller 90c which calculates the d-axis voltage command value ΔVd by controlling and amplifying the deviation ΔId; and a q-axis current PI controller 90e which calculates the q-axis voltage command value ΔVq by controlling and amplifying the deviation ΔIq.

In addition, a dq-three-phase transforming section 93A substituted for the γδ-three-phase transforming section 93 generates an output by converting the d-axis voltage command value Vd and the q-axis voltage command value Vq on the d-q coordinate into the U-phase output voltage Vu, the V-phase output voltage Vv, and the W-phase output voltage Vw which are voltage command values on the three-phase AC coordinate as a stationary coordinate. Further, a three-phase-dq transforming section 98A substituted for the three-phase-γδ transforming section 98 calculates and outputs the d-axis current Id and the q-axis current Iq by converting the detected values of the phase currents Iu, Iv, and Iw into values on the d-q coordinate. Further, a rotation-period estimator 96c substituted for the rotation-period estimator 96b calculates and outputs the estimate rotation number ωr and the rotation-period estimate rotation angle θr on the basis of, for example, the U-phase-to-phase voltage Vun (=Vu−Vn) which is output from the first phase-to-phase voltage calculating section 95a and the U-phase detection current Ius which is output from the current sensor 76.

In addition, in the above-mentioned embodiment, the stop-period estimator 96a estimates, on the basis of the phase-to-phase voltage ratio Vun/Vvn, the two estimate value candidates (for example, θ1 and θ3) of the stop-period rotation angle θs. However, the present invention is not limited to this. For example, on the basis of the line-to-line voltage ratio Vuv/Vwu, two estimate value candidates (for example, θ1 and θ3) of the stop-period rotation angle θs may be estimated.

Figure 24:
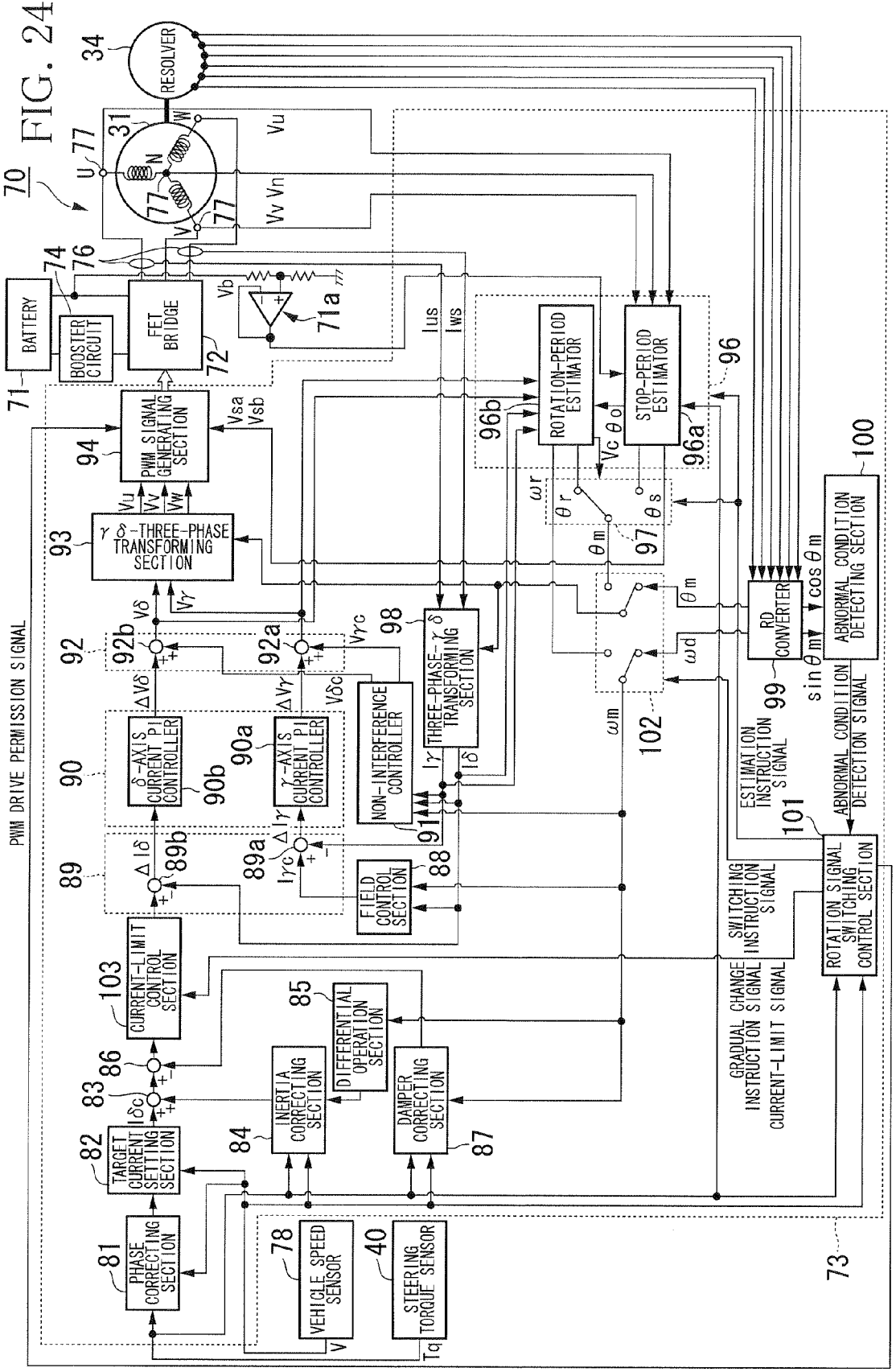
FIG. 24 is a configuration diagram of a motor control device according to a second modified example of an embodiment of the present invention.

In the motor control device 70 according to a second modified example, for example, as shown in FIG. 24, the detection signal, which is output from the voltage sensor 77 for detecting the phase voltages Vu, Vv, and Vw, is input to the stop-period estimator 96a.

In addition, the stop-period estimator 96a calculates the line-to-line voltages Vuv (=Vu−Vv) and Vwu (=Vw−Vu). Moreover, by using the fact that the line-to-line voltage ratio Vuv/Vwu is approximately equal to the line-to-line inductance ratio Luv/Lwu, the estimator acquires the stop-period rotation angle θs by searching the third map representing a predetermined correspondence relationship between the line-to-line voltage ratio Vuv/Vwu and the stop-period rotation angle θs.

Additionally, the third map is, for example, a map representing a predetermined correspondence relationship between the line-to-line voltage ratio Vuv/Vwu and the stop-period rotation angle θs. In the range of 0° to 360° in the electric angle (edeg), four values α1, ..., α4 of the stop-period rotation angle θs correspond to the appropriate single value of the line-to-line voltage ratio Vuv/Vwu. That is, two cycles of the line-to-line voltage ratio Vuv/Vwu correspond to 360° in the electric angle (edeg).

In addition, the stop-period estimator 96a acquires the stop-period rotation angle θs by searching a fourth map representing a predetermined correspondence relationship between the line-to-line voltage Vwu and the stop-period rotation angle θs in order to select any two of the four values α1, ..., α4 of the stop-period rotation angle θs searched on the basis of the third map.

The fourth map is, for example, a map representing a predetermined correspondence relationship between the line-to-line voltage Vwu and the stop-period rotation angle θs. In the range of 0° to 360° in the electric angle (edeg), four values β1, ..., β4 of the stop-period rotation angle θs correspond to the appropriate single value of the line-to-line voltage Vwu. That is, two cycles of the line-to-line voltages Vuv and Vwu correspond to 360° in the electric angle (edeg).

Then, from the four values α1, ..., α4 of the stop-period rotation angle θs searched on the basis of the third map, two values, which are equivalent to any two of the four values β1, ..., β4 of the stop-period rotation angle θs corresponding to the line-to-line voltage Vwu, are selected as the estimate value candidates of the stop-period rotation angle θs.

In order to obtain the accurate stop-period rotation angle θs even when the battery voltage (that is, the power source voltage of the FET bridge 72) varies, the battery voltage Vb is detected, and by use of the battery voltage Vb, the line-to-line voltage Vwu is corrected. By use of the corrected line-to-line voltage Vwu, the fourth map is searched, thereby obtaining the four values β1, ..., β4 of the stop-period rotation angle θs. Hence, for example, as shown in FIG. 24, the voltage follower circuit 71a having the operational amplifier is provided between the stop-period estimator 96a and the battery 71 (+B), and the output of the voltage follower circuit 71a is input to the stop-period estimator 96a.

In addition, for example, as represented by the following Formula (7), each magnitude of the line-to-line voltages Vuv (=Vu−Vv), Vvw (=Vv−Vw), and Vwu (=Vw−Vu) according to the second modified example is √3 times each magnitude of the phase-to-phase voltages Vun, Vvn, and Vwn according to the above-mentioned embodiment, and thus each phase thereof is delayed by π/6.

[Formula 7]

$$\left.\begin{array}{l} Vuv = \sqrt{3} \times Vun \times \varepsilon^{-j\frac{\pi}{6}} \\ Vvw = \sqrt{3} \times Vvn \times \varepsilon^{-j\frac{\pi}{6}} \\ Vwu = \sqrt{3} \times Vwn \times \varepsilon^{-j\frac{\pi}{6}} \end{array}\right\} \quad (7)$$

In addition, in the above-mentioned embodiment, the stop-period estimator 96a sets the flag value of the driving direction invert flag to "1" when it is determined that the temporary estimate value (for example, θ1) of the stop-period rotation angle θs is not appropriately set at the time of supplying a predetermined minute current to the motor 31. Thereafter, the estimator sets the other (for example, θ3) of the two estimate value candidates (for example, θ1 and θ3) of the stop-period rotation angle θs selected on the basis of the second map as the estimate value of the stop-period rotation angle θs of the motor 31 being in the stopped state before the supply of the predetermined minute current. However, the present invention is not limited to this. For example, even when it is determined that the temporary estimate value (for example, θ1) of the stop-period rotation angle θs is not appropriately set, the temporary estimate value may be set to the estimate value of the stop-period rotation angle θs of the motor 31 being in the stopped state before the supply of the predetermined minute current. Then, as shown in FIG. 13, by setting the flag value of the driving direction invert flag to "1", when the assisting torque of the motor 31 is generated in accordance with the steering torque Tq after the time at which the steering torque Tq detected by the steering torque sensor 40 is equal to or more than the predetermined assisting lower-limit torque, the assisting torque generating direction may be inverted without changing the magnitude of the assisting torque.

In addition, in the above-mentioned embodiment, instead of the resolver 34, a rotation sensor such as a Hall element may be employed.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

Even when an abnormal condition occurs in the rotation sensor for directly detecting the rotation angle of the motor, it is possible to perform appropriate driving control while promptly and accurately estimating the rotation angle, and it is also possible to prevent a driver from feeling uncomfortable when steering.

1: ELECTRIC STEERING SYSTEM
31: MOTOR
34: RESOLVER (ROTATION ANGLE DETECTION PORTION)
40: STEERING TORQUE SENSOR (STEERING TORQUE DETECTION PORTION)
63: ROTOR
64: STATOR
64A: STATOR COIL
70: MOTOR CONTROL DEVICE
72: FET BRIDGE
73: CONTROL SECTION (DRIVING CONTROL PORTION, STEERING CONTROL PORTION)
78: VEHICLE SPEED SENSOR (VEHICLE SPEED DETECTION PORTION)
82: TARGET CURRENT SETTING SECTION (TARGET DRIVING AMOUNT SETTING PORTION)
83: FIRST CORRECTION COMPUTING SECTION (TARGET DRIVING AMOUNT SETTING PORTION)
86: SECOND CORRECTION COMPUTING SECTION (TARGET DRIVING AMOUNT SETTING PORTION)
94: PWM SIGNAL GENERATING SECTION
96: ROTATION ANGLE ESTIMATOR (ROTATION ANGLE ESTIMATION PORTION)
100: ABNORMAL CONDITION DETECTING SECTION (ABNORMAL CONDITION DETECTION PORTION)

What is claimed is:

1. A motor control device, comprising:
   a rotation angle detection portion that detects a rotation angle of a motor and outputs a detected rotation angle signal;
   an abnormal condition detection portion that detects presence or absence of an abnormal condition of the rotation angle detection portion;
   a rotation angle estimation portion that estimates the rotation angle of the motor based on a voltage of a coil of the motor and outputs an estimated rotation angle signal; and
   a driving control portion that
      controls driving of the motor on the basis of the detected rotation angle signal, when the abnormal condition detection portion does not detect an abnormal condition of the rotation angle detection portion, and
      controls driving of the motor on the basis of the estimated rotation angle signal, when the abnormal condition detection portion detects an abnormal condition of the rotation angle detection portion.

2. The motor control device according to claim 1, wherein
   when the abnormal condition detection portion detects the abnormal condition of the rotation angle detection portion,
   the driving control portion gradually increases a control amount of the driving control of the motor on the basis of the estimate rotation angle signal when changing a control process from the driving control of the motor based on the rotation angle signal to the driving control of the motor based on the estimate rotation angle signal.

3. The motor control device according to claim 1, wherein the rotation angle detection portion comprises a resolver.

4. An electric steering system, comprising:
   a motor control device, comprising:
      a rotation angle detection portion that detects a rotation angle of a motor and outputs a detected rotation angle signal,
      an abnormal condition detection portion that detects presence or absence of an abnormal condition of the rotation angle detection portion,
      a rotation angle estimation portion that estimates the rotation angle of the motor based on a voltage of a coil of the motor and outputs an estimated rotation angle signal, and
      a driving control portion that
         controls driving of the motor on the basis of the detected rotation angle signal, when the abnormal condition detection portion does not detect an abnormal condition of the rotation angle detection portion, and
         controls driving of the motor on the basis of the estimated rotation angle signal, when the abnormal condition detection portion detects an abnormal condition of the rotation angle detection portion;
   a steering torque detection portion that detects a steering torque of the electric steering system and outputs a steering torque signal;
   a vehicle speed detection portion that detects a speed of a vehicle and outputs a vehicle speed signal; and
   a steering control portion that controls driving of the motor by the driving control portion and causes the motor to generate an assist torque for assisting the steering torque, in accordance with the steering torque signal which is output from the steering torque detection portion, the vehicle speed signal which is output from the vehicle speed detection portion, and the rotation angle signal or the estimate rotation angle signal which is output from the motor control device.

5. The electric steering system according to claim 4, wherein
   when the vehicle speed signal which is output from the vehicle speed detection portion is less than a predetermined value,
   the steering control portion allows the driving control portion to change a control process from the driving control of the motor based on the rotation angle signal to the driving control of the motor based on the estimate rotation angle signal.

6. The electric steering system according to claim 4, wherein
   when the steering torque signal which is output from the steering torque detection portion is less than a predetermined value,
   the steering control portion allows the driving control portion to change a control process from the driving control of the motor based on the rotation angle signal to the driving control of the motor based on the estimate rotation angle signal.

7. The electric steering system according to claim wherein the steering control portion:
- includes a target driving amount setting portion that sets a target amount of the driving control of the motor on the basis of the vehicle speed signal which is output from the vehicle speed detection portion and the steering torque signal which is output from the steering torque detection portion;
- controls the driving of the motor by the driving control portion, in accordance with the target amount of the driving control which is set by the target driving amount setting portion; and
- allows the driving control portion to change a control process from the driving control of the motor based on the rotation angle s gnat to the driving control of the motor based on the estimate rotation angle signal, when the target amount of the driving control which is set by the target driving amount setting portion is less than a predetermined value.

* * * * *